(12) United States Patent
Moore et al.

(10) Patent No.: US 10,127,196 B2
(45) Date of Patent: Nov. 13, 2018

(54) SYSTEMS AND METHODS FOR MANAGING NOTES

(71) Applicant: 3M INNOVATIVE PROPERTIES COMPANY, St. Paul, MN (US)

(72) Inventors: Richard J. Moore, Maplewood, MN (US); Guruprasad Somasundaram, Minneapolis, MN (US); Diane R. Wolk, Woodbury, MN (US); Brian J. Stankiewicz, Mahtomedi, MN (US); Robert D. Lorentz, North Oaks, MN (US); Scott D. Pearson, Atlanta, GA (US); Shingo Moriyasu, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 200 days.

(21) Appl. No.: 14/600,707

(22) Filed: Jan. 20, 2015

(65) Prior Publication Data

US 2015/0135046 A1  May 14, 2015

Related U.S. Application Data

(63) Continuation-in-part of application No. 14/230,892, filed on Mar. 31, 2014.

(Continued)

(51) Int. Cl.
*G06F 17/21* (2006.01)
*G06Q 10/06* (2012.01)
*G06F 17/24* (2006.01)

(52) U.S. Cl.
CPC ..... *G06F 17/212* (2013.01); *G06Q 10/06311* (2013.01)

(58) Field of Classification Search
CPC .............................. G06F 17/211; G06F 17/21
See application file for complete search history.

(56) References Cited

U.S. PATENT DOCUMENTS

| 5,319,745 A | 6/1994 | Vinsonneau |
| 5,465,165 A | 11/1995 | Tanio |

(Continued)

FOREIGN PATENT DOCUMENTS

| EP | 1182861 | 2/2002 |
| JP | 2006-059020 | 3/2006 |

(Continued)

OTHER PUBLICATIONS

Sinkov, "Evernote gives Iconic Post-It® Notes a Digital Life." Evernote Blog Evernote Gives Iconic Postit notes a Digital Life Comments, Evernote, Sep. 26, 2013, Web. Nov. 18, 2014, 5 pages.

(Continued)

*Primary Examiner* — James J Debrow
(74) *Attorney, Agent, or Firm* — Sandra K. Nowak

(57) ABSTRACT

A mobile device comprises a sensor to produce image data containing a visual representation of a plurality of physical notes, each of the physical notes comprising separate physical objects, a processor, and at least one module. The module can process the image data to determine boundaries for each of the plurality of physical notes and to determine, based on the boundaries, one or more characteristics for each of the physical notes. The module can also create a digital note representative of each of the plurality of physical notes, apply a set of rules to identify any of the rules that specify criteria satisfied by one or more characteristics of the physical notes, and for each of the identified rules, perform one or more actions specified by the rule to each of the digital notes for which the characteristics of the physical notes satisfies the criteria specified by the rule.

25 Claims, 16 Drawing Sheets

Related U.S. Application Data

(60) Provisional application No. 61/807,510, filed on Apr. 2, 2013.

(56) References Cited

U.S. PATENT DOCUMENTS

| | | | |
|---|---|---|---|
| 5,898,434 | A | 4/1999 | Small |
| 6,351,559 | B1 | 2/2002 | Zhou |
| 6,721,733 | B2 | 4/2004 | Lipson |
| 7,072,512 | B2 | 7/2006 | Mehrotra |
| 7,127,164 | B1 | 10/2006 | Parulski et al. |
| 7,343,415 | B2 | 3/2008 | Kenner |
| 7,561,310 | B2 | 7/2009 | Joyce |
| 7,573,598 | B2 | 8/2009 | Cragun |
| 7,774,479 | B2 | 8/2010 | Kenner |
| 7,837,094 | B2 | 11/2010 | Rhoads |
| 8,069,173 | B2 | 11/2011 | Munekuni |
| 8,113,432 | B2 | 2/2012 | Kimura |
| 8,139,852 | B2 | 3/2012 | Shinjo |
| 8,238,666 | B2 | 8/2012 | Besley |
| 8,256,665 | B2 | 9/2012 | Rhoads |
| 8,380,040 | B2 | 2/2013 | Carter |
| 8,416,466 | B2 | 4/2013 | Takata |
| 8,429,174 | B2 | 4/2013 | Ramani |
| 8,457,449 | B2 | 6/2013 | Rhoads |
| 8,503,791 | B2 | 8/2013 | Conwell |
| 8,542,889 | B2 | 9/2013 | Sarnoff |
| 8,543,926 | B2 | 9/2013 | Giles |
| 8,558,913 | B2 | 10/2013 | Pillman |
| 8,600,167 | B2 | 12/2013 | Showering |
| 8,655,068 | B1 | 2/2014 | Li |
| 2004/0017400 | A1 | 1/2004 | Ly |
| 2004/0172646 | A1* | 9/2004 | McIntyre .......... G06F 8/60 725/1 |
| 2005/0091578 | A1 | 4/2005 | Madan |
| 2006/0039045 | A1 | 2/2006 | Sato |
| 2006/0077468 | A1 | 4/2006 | Loce |
| 2006/0221357 | A1 | 10/2006 | Uzawa |
| 2007/0089049 | A1 | 4/2007 | Gormish |
| 2007/0110277 | A1 | 5/2007 | Hayduchok |
| 2007/0176780 | A1 | 8/2007 | Hart |
| 2008/0021701 | A1 | 1/2008 | Bobick |
| 2008/0075364 | A1 | 3/2008 | Speigle |
| 2008/0136833 | A1 | 6/2008 | Taniguchi et al. |
| 2009/0067671 | A1* | 3/2009 | Alattar .......... G06T 1/0028 382/100 |
| 2009/0284806 | A1 | 11/2009 | Takata |
| 2009/0307602 | A1 | 12/2009 | Brewer |
| 2010/0023878 | A1 | 1/2010 | Douris |
| 2010/0096452 | A1 | 4/2010 | Habraken |
| 2010/0191772 | A1 | 7/2010 | Brown |
| 2010/0202680 | A1 | 8/2010 | Hamasaki |
| 2011/0066658 | A1 | 3/2011 | Rhoads |
| 2011/0164815 | A1 | 7/2011 | Sharma |
| 2011/0187731 | A1 | 8/2011 | Tsuchida |
| 2011/0285123 | A1 | 11/2011 | Wittke |
| 2012/0014456 | A1 | 1/2012 | Martinez Bauza |
| 2012/0099780 | A1 | 4/2012 | Smith et al. |
| 2012/0151577 | A1 | 6/2012 | King |
| 2012/0249575 | A1 | 10/2012 | Krolczyk |
| 2012/0320410 | A1 | 12/2012 | Kakegawa |
| 2012/0324372 | A1* | 12/2012 | Kowalkiewicz ..... G06Q 10/101 715/753 |
| 2013/0022330 | A1 | 1/2013 | Carter et al. |
| 2013/0054636 | A1 | 2/2013 | Tang |
| 2013/0163047 | A1 | 6/2013 | Miyamoto |
| 2013/0217440 | A1 | 8/2013 | Lord |
| 2013/0227476 | A1 | 8/2013 | Frey |
| 2013/0242708 | A1* | 9/2013 | Siu .......... G06Q 10/109 368/10 |
| 2013/0258117 | A1 | 10/2013 | Penov |
| 2013/0258122 | A1 | 10/2013 | Keane |
| 2013/0271784 | A1 | 10/2013 | Nakajima |
| 2014/0024411 | A1 | 1/2014 | Rao |
| 2014/0050409 | A1 | 2/2014 | Constantinou |
| 2014/0056512 | A1 | 2/2014 | Lerios |
| 2014/0089313 | A1* | 3/2014 | Brown .......... G06Q 10/10 707/740 |
| 2014/0294236 | A1 | 10/2014 | Biller et al. |
| 2015/0161571 | A1* | 6/2015 | Judelson .......... G06Q 10/1095 705/7.19 |

FOREIGN PATENT DOCUMENTS

| | | |
|---|---|---|
| JP | 2009-020813 | 1/2009 |
| JP | 2010-231369 | 10/2010 |
| JP | 2011090486 | 5/2011 |
| WO | WO 2012-070935 | 5/2012 |
| WO | WO 2013-085512 | 6/2013 |
| WO | WO 2013-184767 | 12/2013 |

OTHER PUBLICATIONS

Boykov, "Graph Cuts and Efficient N-D Image Segmentation", International Journal of Computer Vision, 2006, vol. 70, No. 2, pp. 109-131.

Davidson, "Calculation of Color Differences From Visual Sensitivity Ellipsoids", Journal of the Optical Society of America, Dec. 1951, vol. 41, No. 12, pp. 1052-1055.

Everitt, "Two Worlds Apart: Bridging the Gap Between Physical and Virtual Media for Distributed Design Collaboration", CHI 2003, Apr. 5-10, 2003, 8 pages.

Felzenszwalb, "Efficient Graph-Based Image Segmentation", International Journal of Computer Vision, 2004, vol. 59, No. 2, pp. 167-181.

Fisher, "Change Detection in Color Images", Proceedings of 7th IEEE Conference on Computer Vision and Pattern, 1999, 6 pages.

Frome, "Visibility of Borders: Separate and Combined Effects of Color Differences, Luminance Contrast, and Luminance Level", J. Opt. Soc. Am., Feb. 1981, vol. 71, No. 2, pp. 145-150.

Geyer, "Experiences From Employing Evernote as a Tool for Documenting Collaborative Design Processes", Conference on Designing Interactive System DIS 2012, Workshop on Supporting Reflection in and on Design Processes, Jun. 12, 2012, 2 pages.

Gur, "Isoluminant Stimuli May Not Expose the Full Contribution of Color to Visual Functioning: Spatial Contrast Sensitivity Measurements Indicate Interaction Between Color and Luminance Processing", Vision Research, Jul. 7, 1992, vol, 32, No. 7, pp. 1253-1262.

Hsieh, "Peripheral Display of Digital Handwritten Notes", 2006, ACM, pp. 285-288.

"Kingjim Shot Note", [online], [retrieved from internet on Sep. 17, 2014], URL :<http://www.kingjim.co.jp/english/products/shotnote/>, 2 pages.

Klemmer, "The Designers Outpost: A Tangible Interface for Collaborative Web Site Design", In Proceedings of UIST, 2001, 10 pages.

K-SVD, "An Algorithm for Designing Overcomplete Dictionaries for Sparse Representation", IEEE Transactions on Signal Processing, Nov. 2006, vol. 54, No. 11, pp. 4311-4322.

Masaoka, "Fast and Accurate Model for Optimal Color Computation", Optics Letters, Jun. 15, 2010, vol. 35, No. 12, pp. 2031-2033.

Mika, "Fisher Discriminant Analysis With Kernels", Neural Networks for Signal Processing IX, 1999. Proceedings of the 1999 IEEE Signal Processing Society Workshop in Neural Networks for Signal Processing IX, 1999, Proceedings of the 1999 IEEE Signal Processing Society Workshop, Aug. 1999, pp. 41-48.

Rajala, "Visual Sensitivity to Color-Varying Stimuli", Human Vision, Visual Processing and Digital Display III, Proc. SPIE. Aug. 27, 1992, vol. 1666, pp. 375-386.

Sharma, "The CIEDE2000 Color Difference Formula: Implementation Notes, Supplementary Test Data, and Mathematical Observations", Color Research & Application, Feb. 2005, vol. 30, No. 1, pp. 21-30.

Yang, "Photonic Crystal Changes Color When Exposed to an Explosion", Nanotechnology, SPIE Inetrnational Year of Light 2015, Apr. 25, 2011, [online]; [retrieved from internet on Sep. 18, 2014], URL<http://spie.org/x47872.xml?pf=true&ArticleID=x47872>, 3 pages.

(56) References Cited

OTHER PUBLICATIONS

International Search Report for PCT International Application No. PCT/US2014/032367, dated Aug. 12, 2014, 2 pages.
Bian, "PalimPost: Information Convergence Using Sticky Notes", $2^{nd}$ International Workshop on the Web of Things, Jun. 12, 2011, pp. 1-6.

* cited by examiner

SYSTEMS AND METHODS FOR MANAGING NOTES

This application is a continuation-in-part of U.S. application Ser. No. 14/230,892, filed Mar. 31, 2014, which claims the benefit of U.S. Provisional Patent Application No. 61/807,510, filed Apr. 2, 2013, the entire content of each being incorporated herein by reference.

TECHNICAL FIELD

The present disclosure relates to note capturing, recognition, extraction, and/or management tools and systems.

BACKGROUND

Paper notes have been broadly used in recording, sharing, and communicating ideas and information. For example, during a collaboration session (e.g., brainstorming session), participants write down ideas on Post-It® notes, whiteboard, or paper, and then share with one another. In addition, people commonly use notes throughout the day to memorialize information or content which the individual does not want to forget. As additional examples, people frequently use notes as reminders of actions or events to take in the future, such as to make a telephone call, revise a document or to fill out a time sheet.

For example, in many situations people participate in a collaboration session by writing information on paper-based notes, such as Post-It® notes. Paper Post-It® notes can readily be removed from a dispenser pad of sticky-back paper Post-It® notes and applied to various surfaces, such as whiteboards, documents, the tops of desks, telephones, or the like. Information can be written on paper Post-It® notes either before or after the paper Post-It® notes are detached from their dispenser pad or attached to their target surfaces. Paper Post-It® notes can be easily moved from one surface to another, such as between documents or between documents and the tops of desks, they can overlap edges or boundaries of documents, they can be layered, and they can be moved with the objects to which they are attached.

Software programs currently exist which permit computer users to create a software-based note in a digital form and to utilize the digital note within a computing environment. For example, a computer user may create a digital note and "attach" the digital note to an electronic document a desktop or electronic workspace presented by the computing environment.

SUMMARY

In general, the disclosure describes techniques for creating and manipulating software notes representative of physical notes.

In one example, a method comprises capturing, by a sensor of a mobile device, image data containing a visual representation of a plurality of physical notes, each of the physical notes comprising separate physical objects; processing the image data with a processor of the mobile device to determine respective boundaries within the image data for each of the plurality of physical notes and to determine, based on the boundaries, one or more characteristics for each of the physical notes; creating, with the processor, a respective digital note representative of each of the plurality of physical notes; applying with the processor, a set of rules to identify which of the rules specify criteria satisfied by one or more of the respective characteristics of the physical notes; and for each of the identified rules, performing, with the processor, one or more actions specified by the respective rule to each of the digital notes for which the characteristics of the corresponding one of the physical notes satisfies the criteria specified by the rule.

In another example, a mobile device comprises a sensor to produce image data containing a visual representation of a plurality of physical notes, each of the physical notes comprising separate physical objects; a processor; and at least one module executable by the processor to process the image data to determine respective boundaries within the image data for each of the plurality of physical notes and to determine, based on the boundaries, one or more characteristics for each of the physical notes, create a respective digital note representative of each of the plurality of physical notes, apply a set of rules to identify any of the rules that specify criteria satisfied by one or more of the respective characteristics of the physical notes, and for each of the identified rules, perform one or more actions specified by the respective rule to each of the digital notes for which the characteristics of the corresponding one of the physical notes satisfies the criteria specified by the rule.

In another example, a non-transitory computer-readable storage device comprises instructions that cause a programmable processor to capture, by a sensor of a mobile device, image data containing a visual representation of a plurality of physical notes, each of the physical notes comprising separate physical objects; process the image data with a processor of the mobile device to determine respective boundaries within the image data for each of the plurality of physical notes and to determine, based on the boundaries, one or more characteristics for each of the physical notes; create, with the processor, a respective digital note representative of each of the physical notes; apply, with the processor, a set of rules to identify which of the rules specify criteria satisfied by one or more of the respective characteristics of the physical notes; and for each of the identified rules, perform one or more actions specified by the respective rule to each of the digital notes for which the characteristics of the corresponding one of the physical notes satisfies the criteria specified by the rule.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1A:
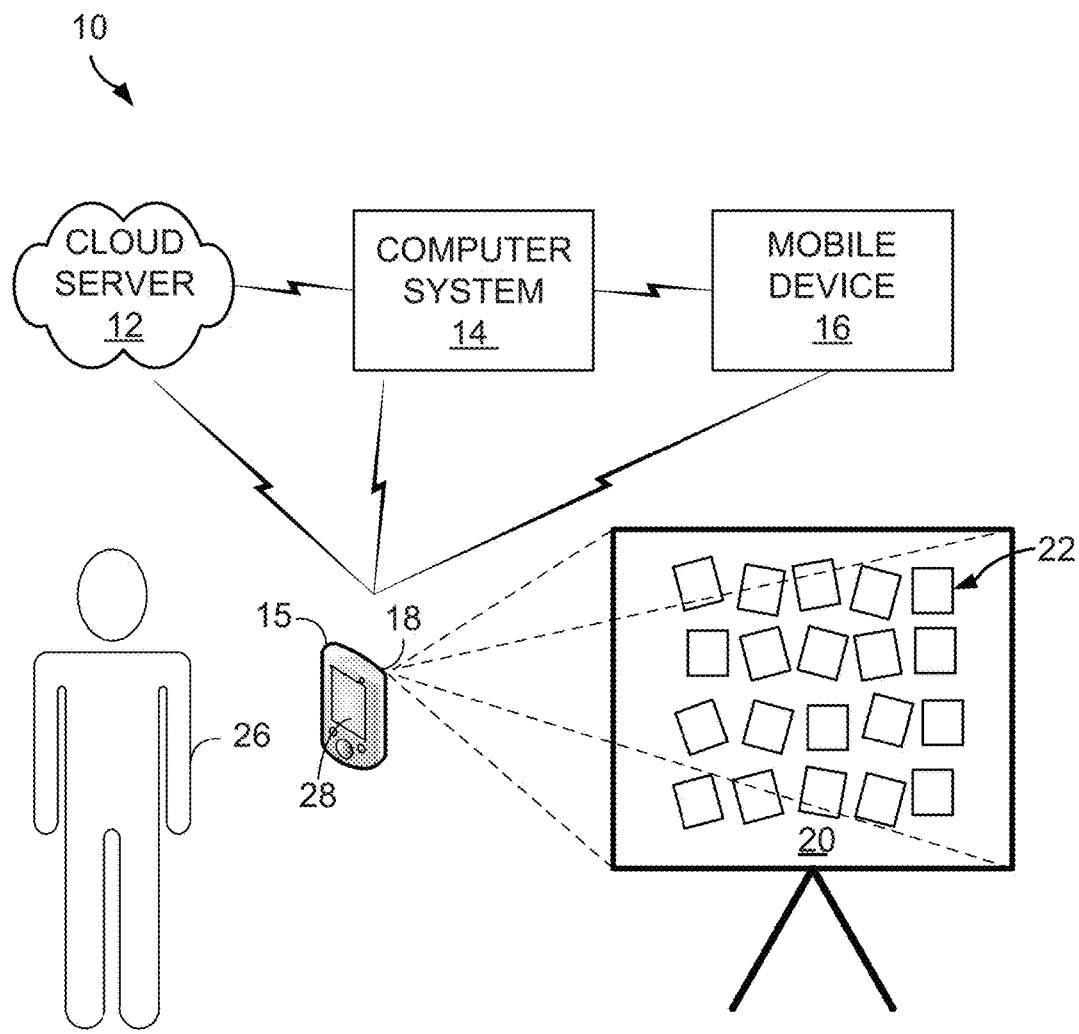
FIG. 1A is a representation illustrating one example of a user capturing an image of a workspace with notes using an image capture device on a mobile device.

The present disclosure describes techniques for creating and manipulating software notes representative of physical notes. For example, techniques are described for recognizing physical notes present within a physical environment, capturing information therefrom and creating corresponding digital representations of the physical notes, referred to herein as digital notes or software-based notes. Further, at least some aspects of the present disclosure are directed to techniques for managing multiple notes, such as storing, retrieving, editing the digital notes, categorizing and grouping the digital notes, or the like.

Notes have been broadly used in recording, sharing, and communicating ideas and information. For example, during a collaboration session (e.g., brainstorming session), participants write down ideas on Post-It® notes, whiteboard, paper, and then share with one another. At least some aspects of the present disclosure are directed to systems and methods of capturing multiple notes and extracting content of notes. In some embodiments, at least some of the notes include a mark to facilitate the recognition and extraction of the notes. In some cases, the notes are captured and identified/recognized in one visual representation of a scene. A visual representation of a scene, for example, can be a digital photograph of note(s) and the surrounding environment. Further, at least some aspects of the present disclosure are directed to systems and methods of managing multiple notes, such as storing and retrieving the notes, categorizing and grouping the notes, or the like. In some cases, the note management system can improve the efficiency in capturing and extracting note content from a large number of notes. In addition, the note management system can improve the efficiency in grouping and managing notes.

In general, notes can include physical notes and digital notes. Physical notes generally refer to objects with a general boundary and recognizable content. Physical notes can include the resulting objects after people write, draw, or enter via other type of inputs on the objects, for example, paper, white board, or other objects accepting the inputs. By way of examples, physical notes can include hand-written Post-It® notes, paper, or film, white-board with drawings, posters, and signs. In some cases, physical notes can be generated using digital means, e.g., printing onto printable Post-It® notes or printed document. In some cases, one object can include several notes. For example, several ideas can be written on a piece of poster paper or a white-board. In some implementations, to facilitate the recognition of these notes, marks, such as lines, markers, stickers, can be applied to the edges of the notes. Physical notes can be two-dimensional or three dimensional. Physical notes can have various shapes and sizes. For example, a physical note may be a 3 inches×3 inches note; a physical note may be a 26 inches×39 inches poster; and a physical note may be a triangle metal sign. In some cases, physical notes have known shapes and/or sizes. Digital notes generally refer to digital objects with information and/or ideas. Digital notes can be generated using digital inputs. Digital inputs can include, for example, keyboards, touch screens, digital cameras, digital recording devices, stylus, digital pens, or the like. In some cases, digital notes may be representative of physical notes.

In some cases, notes are used in a collaboration space. Collaboration space generally refers to a gathering area allowing more than one person to share ideas and thoughts with each other. The collaboration space can include virtual space allowing a group of persons to share ideas and thoughts remotely, besides the gathering area.

FIG. 1A illustrates an example of a note recognition environment 10. In the example of FIG. 1A, environment 10 includes a mobile device 15 to capture and recognize one of more notes 22 from a workspace 20. As described herein, mobile device provides an execution environment for one or more software applications that, as described, can efficiently capture and extract note content from a large number of physical notes, such as the collection of notes 22 from workspace 20. In this example, notes 22 may be the results of a collaborative brainstorming session having multiple participants. As described, mobile device 15 and the software executing thereon may perform a variety of note-related operations, including automated creation of digital notes representative of physical notes 22 of workspace 20.

In the example implementation, mobile device 15 includes, among other components, an image capture device 18 and a presentation device 28. In addition, although not shown in FIG. 1A, mobile device 15 may include one or more processors, microprocessors, internal memory and/or data storage and other electronic circuitry for executing software or firmware to provide the functionality described herein.

In general, image capture device 18 is a camera or other component configured to capture image data representative of workspace 20 and notes 22 positioned therein. In other words, the image data captures a visual representation of an environment, such as workspace 20, having a plurality of visual notes. Although discussed as a camera of mobile device 15, image capture device 18 may comprise other components capable of capturing image data, such as a video recorder, an infrared camera, a CCD (Charge Coupled Device) array, a laser scanner, or the like. Moreover, the captured image data can include at least one of an image, a video, a sequence of images (i.e., multiple images taken within a time period and/or with an order), a collection of images, or the like, and the term input image is used herein to refer to the various example types of image data.

Presentation device 28 may include, but not limited to, an electronically addressable display, such as a liquid crystal display (LCD) or other type of display device for use with mobile device 28. In some implementations, mobile device 15 generates the content to display on presentation device 28 for the notes in a variety of formats, for example, a list, grouped in rows and/or column, a flow diagram, or the like. Mobile device 15 may, in some cases, communicate display information for presentation by other devices, such as a tablet computer, a projector, an electronic billboard or other external device.

As described herein, mobile device 15, and the software executing thereon, provide a platform for creating and manipulating digital notes representative of physical notes 22. For example, in general, mobile device 15 is configured to process image data produced by image capture device 18 to detect and recognize at least one of physical notes 22 positioned within workspace 20. In some examples, the mobile device 15 is configured to recognize note(s) by determining the general boundary of the note(s). After a note is recognized, mobile device 15 extracts the content of at least one of the one or more notes, where the content is the visual information of note 22.

In some example implementations, mobile device 15 provides functionality by which user 26 is able to export the digital notes to other systems, such as cloud-based repositories (e.g., cloud server 12) or other computing devices (e.g., computer system 14 or mobile device 16).

In the example of FIG. 1A, mobile device 15 is illustrated as a mobile phone. However, in other examples, mobile device 15 may be a tablet computer, a personal digital assistant (PDA), a laptop computer, a media player, an e-book reader, a wearable computing device (e.g., a watch, eyewear, a glove), or any other type of mobile or non-mobile computing device suitable for performing the techniques described herein.

As further described below, mobile device 15 may implement techniques for automated detection and recognition of physical notes 22 and extraction of information, content or other characteristics associated with each of the physical notes. For example, mobile device 15 may allow user 26 fine-grain control over actions or events taken by mobile device 15 responsive to detection of one or more physical notes 22 having characteristics that match specified criteria, such as color, shape, size, markings and the like. In one example, detection of the physical notes may be input to an event control system executing on mobile device 15. For example, detection of one or more physical notes 22 having characteristics that match specified criteria may be used to trigger actions such as:
  grouping digital notes into one or more groups based on characteristics of the respective physical notes 22,
  saving a photo or image of the note to computer system 14 or cloud server 12,
  automatically creating a reminder within a calendar application executing on mobile device 15,
  automatically scheduling an event within the calendar application,
  automatically outputting a message, such as an email or text message, and
  automatically uploading content or information associated with the detected note to social media services.

Figure 1B:
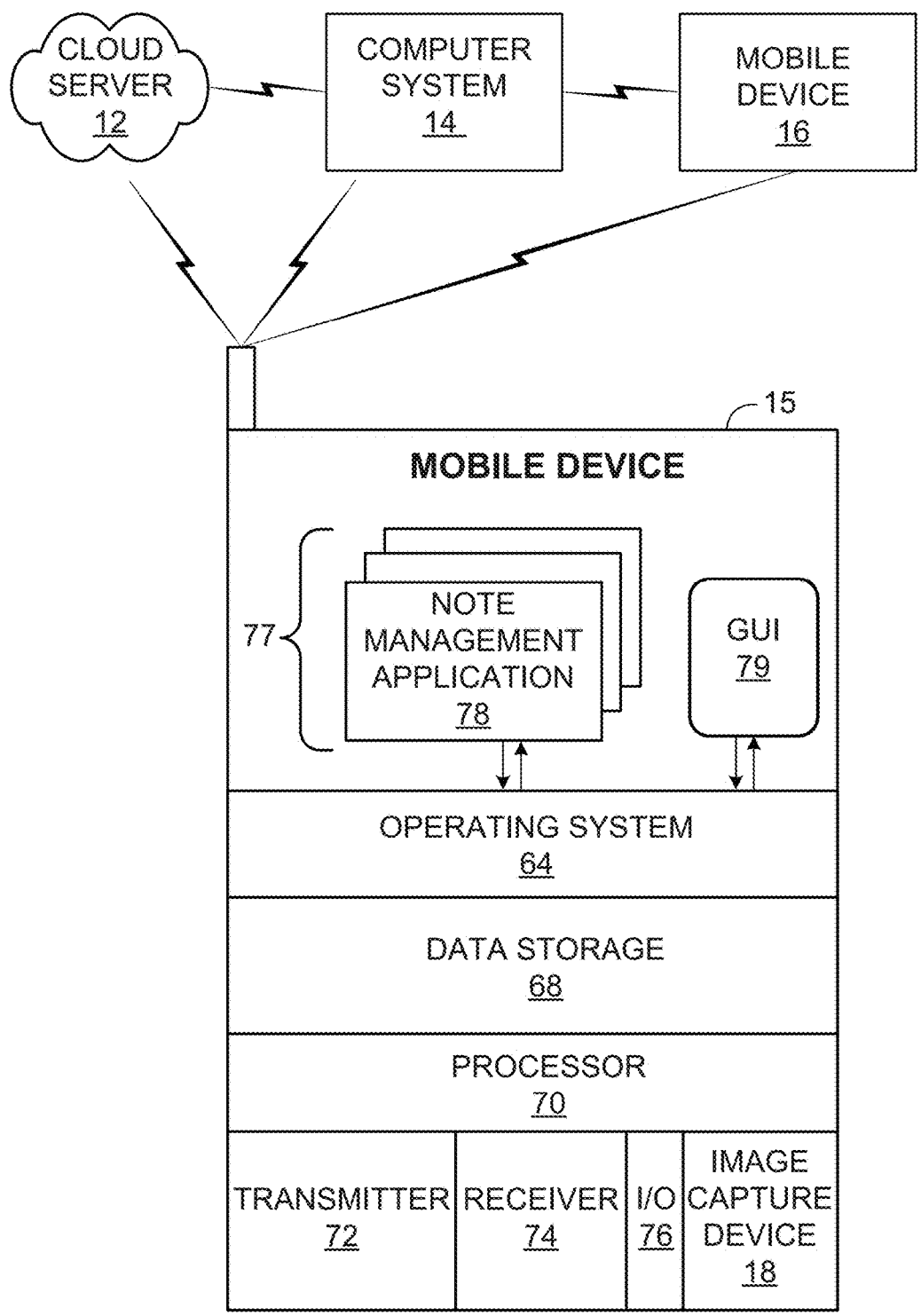
FIG. 1B is a block diagram illustrating one example of the mobile device.

FIG. 1B illustrates a block diagram illustrating an example of a mobile device that operates in accordance with the techniques described herein. For purposes of example, the mobile device of FIG. 1B will be described with respect to mobile device 15 of FIG. 1A

In this example, mobile device 15 includes various hardware components that provide core functionality for operation of the device. For example, mobile device 15 includes one or more programmable processors 70 configured to operate according to executable instructions (i.e., program code), typically stored in a computer-readable medium or data storage 68 such as static, random-access memory (SRAM) device or Flash memory device. I/O 76 may include one or more devices, such as a keyboard, camera button, power button, volume button, home button, back button, menu button, or presentation device 28 as described in FIG. 1A. Transmitter 72 and receiver 74 provide wireless communication with other devices, such as cloud server 12, computer system 14, or other mobile device 16 as described in FIG. 1A, via a wireless communication interface as described in FIG. 1A, such as but not limited to high-frequency radio frequency (RF) signals. Mobile device 15 may include additional discrete digital logic or analog circuitry not shown in FIG. 1B.

In general, operating system 64 executes on processor 70 and provides an operating environment for one or more user applications 77 (commonly referred to "apps"), including note management application 78. User applications 77 may, for example, comprise executable program code stored in computer-readable storage device (e.g., data storage 68) for execution by processor 70. As other examples, user applications 77 may comprise firmware or, in some examples, may be implemented in discrete logic.

In operation, mobile device 15 receives input image data and processes the input image data in accordance with the techniques described herein. For example, image capture device 18 may capture an input image of an environment having a plurality of notes, such as workspace 20 of FIG. 1A having of notes 22. As another example, mobile device 15 may receive image data from external sources, such as cloud server 15, computer system 14 or mobile device 16, via receiver 74. In general, mobile device 15 stores the image data in data storage 68 for access and processing by note management application 78 and/or other user applications 77.

As shown in FIG. 1B, user applications 77 may invoke kernel functions of operating system 64 to output a graphical user interface (GUI) 79 for presenting information to a user of mobile device. As further described below, note management application 78 may construct and control GUI 79 to provide an improved electronic environment for generating and manipulating corresponding digital notes representative of physical notes 22. For example, note management application 78 may construct GUI 79 to include mechanisms that allows user 26 to easily control events that are automatically triggered in response to capturing notes of certain characteristics. In addition, note management application 78 may construct GUI 79 to include mechanisms that allow user 26 to manage relationships between groups of the digital notes.

Figure 1C:
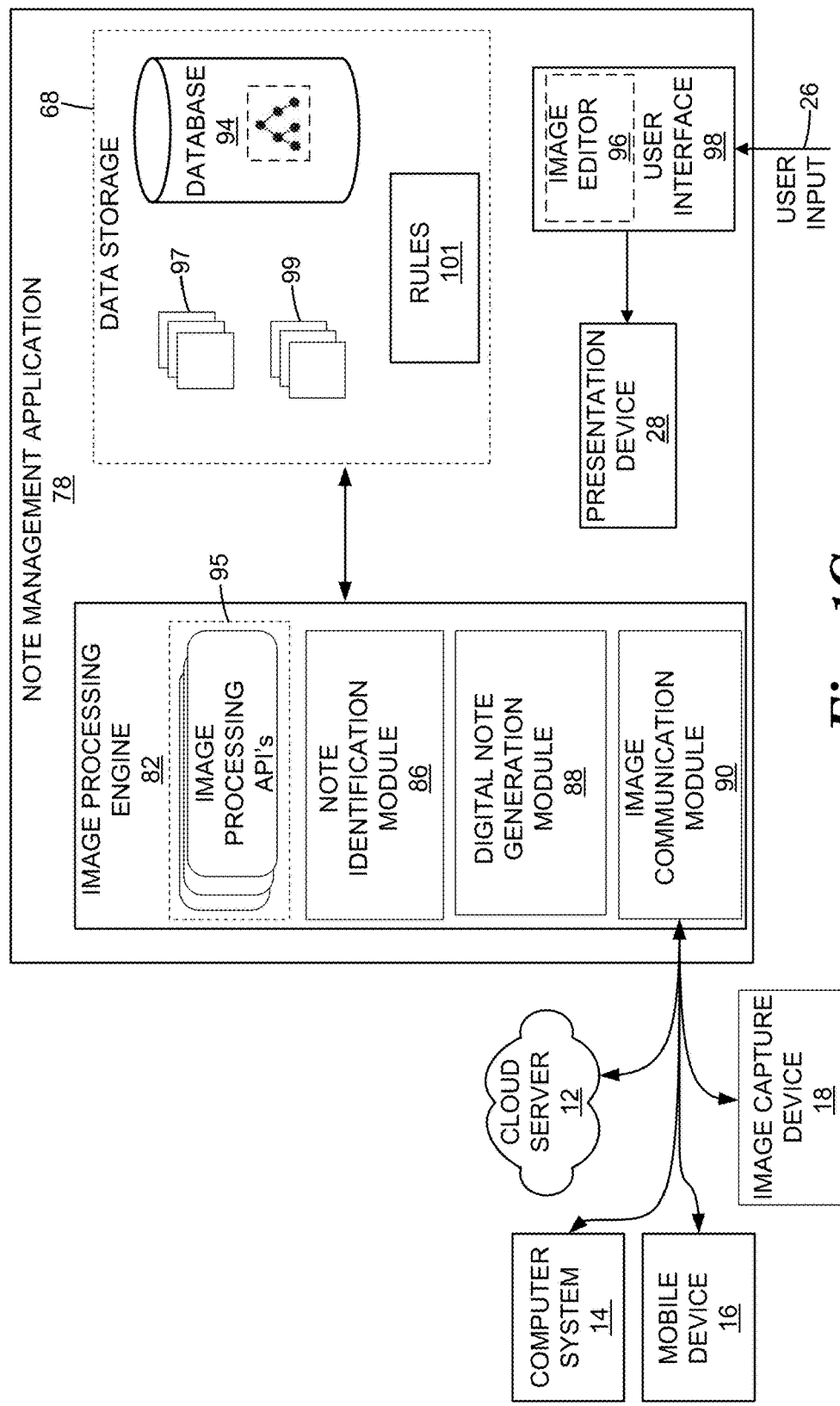
FIG. 1C is a block diagram illustrating one example of a note management application executing on the mobile device.

FIG. 1C is a block diagram illustrating one example implementation of note management application 78 that operates in accordance with the techniques described herein. Although described as a user application 77 executing on mobile device 15, the examples described herein may be implemented on any computing device, such as cloud server 12, computer system 14, or other mobile devices.

In this example, note management application 78 includes image processing engine 82 that provides image processing and object recognition functionality. Image processing engine 82 may include image communication module 90, note identification module 86 and digital note generation module 88. In addition, image processing engine 82 includes image processing Application Programming Interfaces (APIs) 95 that provide a library of image manipulation functions, e.g., image thresholding, masking, filtering, edge detection, and the like, for use by the other components of image processing engine 82.

In general, image data may be stored in data storage device 68. In this example, note management application 78 stores images 97 within data storage device 68. Each of images 97 may comprise pixel data for environments having a plurality of physical images, such as workspace 20 of FIG. 1A.

As described herein, note identification module 86 processes images 97 and identifies (i.e., recognizes) the plurality of physical notes in the images. The input image may be processed by note identification module 86 using marker and/or non-marker detection processes. Digital note generation module 88 generates digital notes 99 corresponding to the physical notes recognized within the images 97. For example, each of digital notes 99 corresponds to one of the physical notes identified in an input image 97. During this process, digital note generation module 88 may update database 94 to include a record of the digital note, and may store within the database information (e.g., content) extracted from the input image within boundaries determined for the physical note as detected by note identification module 86. Moreover, digital note generation module 88 may store within database 94 metadata associating the digital notes into one or more groups of digital notes.

Further, note management application 78 may be configured, e.g., by user input 26, to specify rules 101 that trigger actions in response to detection of physical notes having certain characteristics. For example, user interface 98 may, based on the user input, map action to specific characteristics of notes. Note management application 78 may output user interface 98 by which the user is able to specify rules having actions, such as a note grouping action, or an action related to another software application executing on the mobile device, such as an action related to a calendaring application. For each rule, user interface 98 allows the user to define criteria for triggering the actions. During this configuration process, user interface 98 may prompt the user to capture image data representative of an example note for triggering an action and process the image data to extract characteristics, such as color or content. User interface 98 may then present the determined criteria to the user to aid in defining corresponding rules for the example note.

Image communication module 90 controls communication of image data between mobile device 15 and external devices, such as cloud server 12, computer system 14, mobile device 16, or image capture device 18. In some examples, image communication module 90 may, for example, allow a user to communicate processed or unprocessed images 97 of environments and/or digital notes and associated information extracted therefrom including metadata from database 68. In some examples, image communication module 90 exports this data to a zip file that may be communicated by FTP, HTTP, email, Bluetooth or other mechanism.

In the example of FIG. 1, note management application 78 includes user interface 98 that constructs and controls GUI 79 (FIG. 1B). As described below, user interface 98 may, in some examples, output for display an input image 97 overlaid with the plurality of digital notes 99, where each of the digital notes is overlaid in place of a corresponding physical note. In addition, user interface 98 may display a group of digital notes 99 that has been designated by the user. This group of digital notes 99 may be, for example, a subset of the digital notes recognized in a particular input image 97. User interface 98 may display this designated group (set) of the digital notes on a second portion of GUI 79 and allow user 26 to easily add or remove digital notes 99 from the designated group.

In some example implementations, user interface 98 provides an image editor 96 that allows a user to edit the overlay image and/or the digital notes. In another example, digital note generation module 88 may include a process or processes that enhances the extracted information from the input image.

Figure 1D:
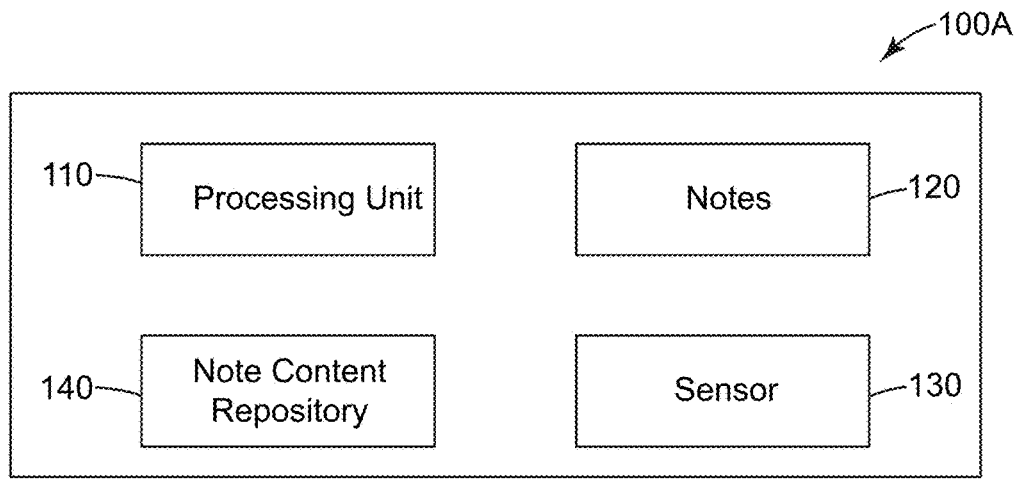
FIG. 1D illustrates another embodiment of a note recognition system.

FIG. 1D illustrates another example embodiment of a note recognition system 100A. The system 100A can include a processing unit 110, one or more notes 120, a sensor 130, and note content repository 140. The processing unit 110 can include one or more processors, microprocessors, computers, servers, and other computing devices. The sensor 130, for example, an image sensor, is configured to capture a visual representation of a scene having the one or more notes 120. The sensor 130 can include at least one of a camera, a video recorder, an infrared camera, a CCD (Charge Coupled Device) array, a scanner, or the like. The visual representation can include at least one of an image, a video, a sequence of images (i.e., multiple images taken within a time period and/or with an order), a collection of images, or the like. The processing unit 110 is coupled to the sensor 130 and configured to receive the visual representation. In some cases, the processing unit 110 is electronically coupled to the sensor 130. The processing unit 110 is configured to recognize at least one of the one or more notes 120 from the visual representation. In some embodiments, the processing unit 110 is configured to recognize note(s) by determining the general boundary of the note(s). After a note is recognized, the processing unit 110 extracts the content of the note. In some cases, the processing unit 110 is configured to recognize and extract the content of more than one note from a visual representation of a scene having those notes.

In some cases, the processing unit 110 can execute software or firmware stored in non-transitory computer-readable medium to implement various processes (e.g., recognize notes, extract notes, etc.) for the system 100A. The note content repository 140 may run on a single computer, a server, a storage device, a cloud server, or the like. In some other cases, the note content repository 140 may run on a series of networked computers, servers, or devices. In some implementations, the note content repository 140 includes tiers of data storage devices including local, regional, and central. The notes 120 can include physical notes arranged orderly or randomly in a collaboration space and the sensor 130 generates a visual representation of the notes 120 in the collaboration space.

In some embodiments, at least some of the one or more notes 120 include a mark, which can facilitate the identification, recognition, and/or authentication of a note. In some embodiments, a mark includes at least one of a barcode, a color block, a color code, a fiduciary mark, a trademark logo, a dot, a hole, and the like. The shape and/or color of the note itself may be used as the mark to facilitate the identification, recognition, and/or authentication of a note. In some cases, the mark can include a plurality of elements arranged in certain patterns, for example, fiduciary marks at four corners of a rectangular note. In some other cases, the mark can include a plurality of elements, where at least some elements are non-visible elements that can be used to provide authentication information, for example, RFID (radio frequency identification) tags. By way of example, a mark can be made using at least one of a retroreflective material, an optically variable ink, a colored ink, infrared absorbing ink, fluorescent ink, watermark, glossy material, iridescent material, multi-layer optical film, colloidal crystals, perforated marks, structured color, floating image, window thread, or the like. In some embodiments, the processing unit 110 first recognizes the mark on a note from a visual representation, determines the location of the mark on the visual representation, and then extracts the content of the note based on the recognized mark. In some cases, the processing unit 110 extracts the content of the note based upon the recognized mark, a known shape of the note, and a known relative position of the mark on the note. In some implementations, the processing unit 110 extracts the content of the note from the visual representation in real-time (i.e., process the data in a transitory storage) without storing the visual representation in a non-transitory storage.

In some implementations, the note recognition system 100A can include a presentation device (not shown in FIG. 1D) to show to the user which notes are recognized and/or which notes' content have been extracted. Further, the note recognition system 100A can present the extracted content via the presentation device. In some embodiments, the processing unit 110 can authenticate a note before extracting the content of the note. If the note is authenticated, the content will be extracted and stored in the note content repository 140. In some cases, the processing unit can extract the authentication information from the mark on the note. In such cases, the authentication information can be visible or non-visible on the mark. For example, the mark on a note can include a symbol, for example, a company logo, a matrix code, a barcode, a color code, or the like. As another example, the mark on the note can include a tag to store information that can be retrieved by a suitable reader. For example, the mark can include a RFID tag, a near field communication (NFC) tag, or the like.

In some embodiments, the sensor 130 can generate a first visual representation of a scene having several notes 120, for example, taking a photograph or a video clip of the notes with the surrounding environment. Each of the notes has a mark. The processing unit 110 identifies the marks, determines the location of the marks, and uses the location of the marks to control the sensor 130 to generate a second visual representation of the scene having the notes 120, for example, taking a zoomed-in image of the notes. The processing unit 110 can further recognize and extract content of notes from the second visual representation.

Figure 1E:
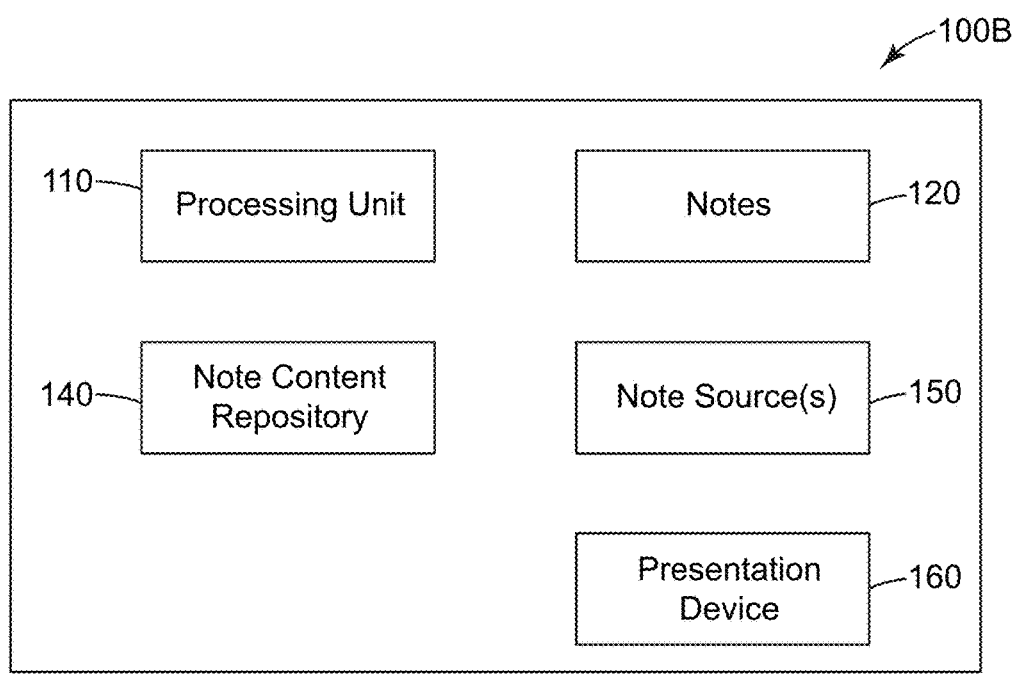
FIG. 1E illustrates another embodiment of a note management system.

FIG. 1E illustrates an embodiment of a note management system 100B. In this embodiment, the note management system 100B includes processing unit 110, one or more notes 120, one or more note sources 150, and a note content repository 140. In some cases, the system 100B includes a presentation device 160. The processing unit 110, the notes 120, and the note content repository 140 are similar to the components for the note recognition system 100A as illustrated in FIG. 1A. The note sources 150 can include sources to provide content of physical notes, such as a visual representation of a scene having one or more notes, and sources to provide content of digital notes, such as a data stream entered from a keyboard. In some embodiments, the note management system 100B includes a first source and a second source, and the first source is a visual representation of a scene having one or more notes 120. The first source and the second source are produced by different devices. The second source includes at least one of a text stream, an image, a video, a file, and a data entry. The processing unit 110 recognizes at least one of the notes from the first source and extracts the content of the note, as discussed in the note recognition system 100A. In some cases, the processing unit 110 labels the note with a category. The processing unit 110 can label a note based on its specific shape, color, content, and/or other information of the note. For example, each group of note can have a different color (e.g., red, green, yellow, etc.). In some cases, a note 120 can include mark that has one or more elements and the processing unit 110 can label the note based on information extracted from the mark.

In some embodiments, the note management system 100B can include one or more presentation devices 160 to show the content of the notes 120 to the user. The presentation device 160 can include, but not limited to, an electronically addressable display, such as a liquid crystal display (LCD), a tablet computer, a projector, an electronic billboard, a cellular phone, a laptop, or the like. In some implementations, the processing unit 110 generates the content to display on the presentation device 160 for the notes in a variety of formats, for example, a list, grouped in rows and/or column, a flow diagram, or the like.

Various components of the note recognition system and note management system, such as processing unit, image sensor, and note content repository, can communicate via a communication interface. The communication interface includes, but not limited to, any wired or wireless short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2A:
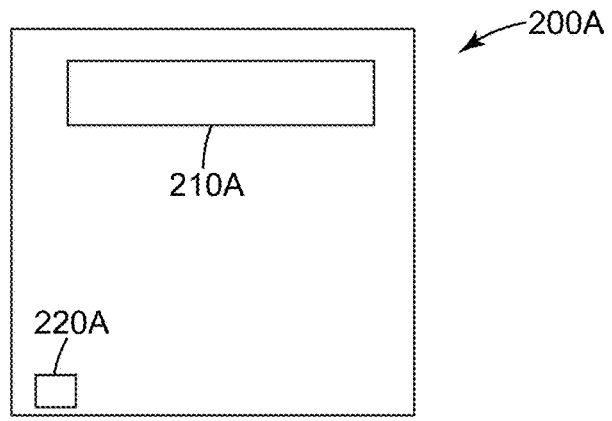
FIGS. 2A-2C illustrate some examples of notes having marks.
Figure 2B:
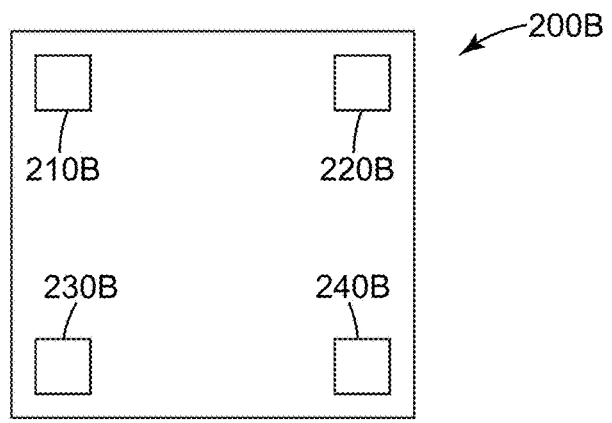
Figure 2C:
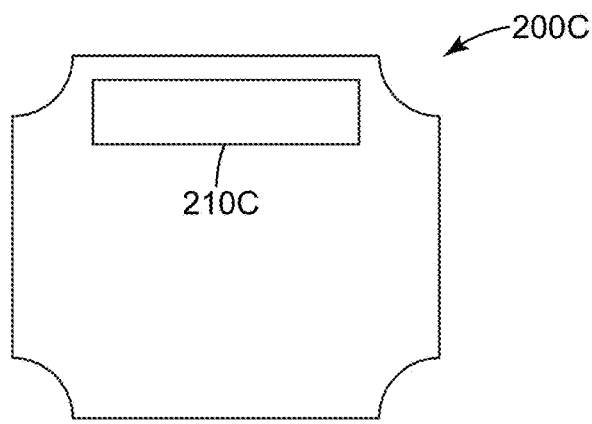

FIGS. 2A-2C illustrate some examples of notes having marks. As illustrated in FIG. 2A, the mark on the note 200A has two elements, element 210A and element 220A. The elements 210A and 220A can have different size, shape, relative position and/or material composition. For example, element 210A is a barcode as an identifier for the note and element 220A is a small rectangle of retro-reflective ink that can be used to determine the boundary of the note. As illustrated in FIG. 2B, the mark on the note 200B can have four elements 210B, 220B, 230B, and 240B. The four elements may have similar or different sizes, shapes, and material compositions. The mark can be used to recognize the size, location, orientation, distortion, and other characteristics of the note, which can be used in content extraction and enhancement. As illustrated in FIG. 2C, the mark on the note 200C has one element 210C. The note 200C has a non-rectangular shape. In some embodiments, the element 210C includes an identifier, for example, to identify the types and the grouping for a note. In some cases, the identifier is a unique identifier.

Figure 3A:
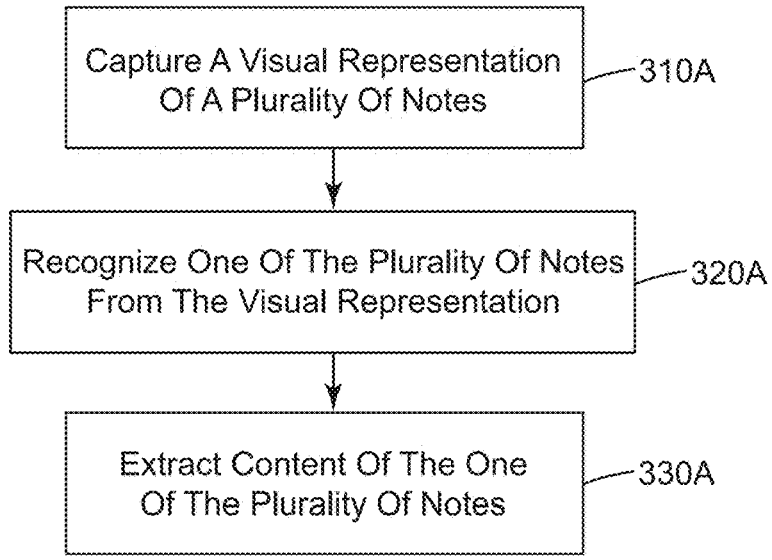
FIG. 3A illustrates a flow diagram of an embodiment of a note recognition and/or management system.

FIG. 3A illustrates a flow diagram of an embodiment of a note recognition and/or management system. Initially, the system captures a visual representation of plurality of notes (step 310A). In some embodiments, the notes are physical notes and it is more efficient to capture more than one note at a time. Next, the system recognizes one of the plurality of notes from the visual representation (step 320A). For example, the system can recognize a specific mark on a note and subsequently determine the general boundary of the note. The system extracts content of the one of the plurality of notes (step 330A). In some embodiments, the system can apply image transformation to at least part of the visual representation before extracting content. In some other embodiments, the system can apply image enhancement or other image processing technique to improve the quality of the extracted content. In yet other embodiments, the system can further recognize text and figures from the extracted content.

Figure 3B:
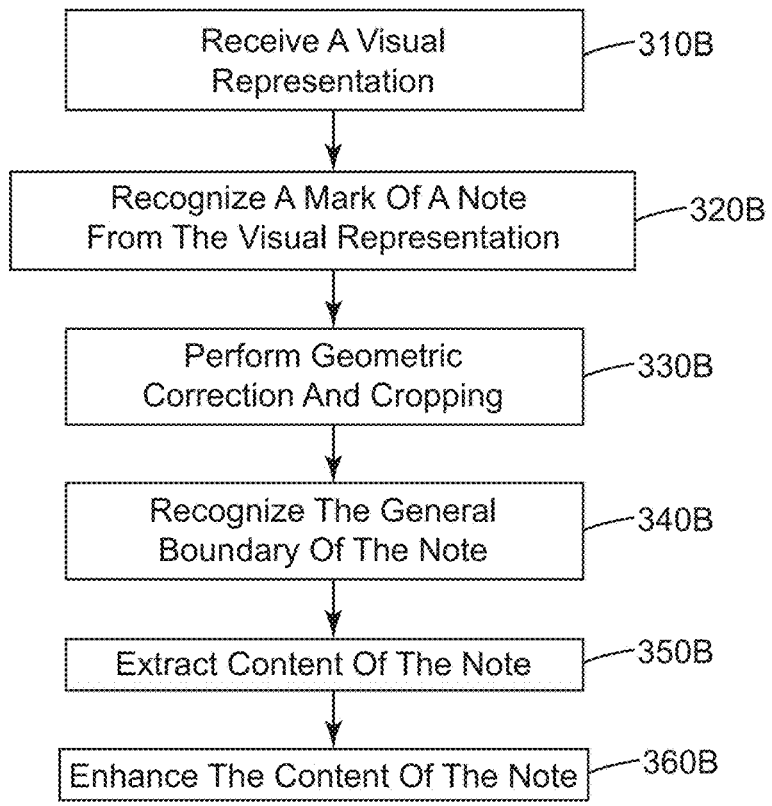
FIG. 3B illustrates a flow diagram of an embodiment of extracting content of notes.

FIG. 3B illustrates a flow diagram of an embodiment of extracting content of notes. First, a visual representation is received by the system (step 310B). The system recognizes a mark on a note from the visual representation (step 320B). After the position and/or shape of the mark is determined, the system may optionally perform geometric correction and cropping to the visual representation (step 330B). Based on the recognized position and/or shape of the mark on the note, the general boundary of the note is recognized on the visual presentation (step 340B). In some embodiments, the system may receive two visual representations of the same set of notes, where each of the notes has a mark. The first visual representation is taken using a light source suitable to capture the marks on the notes. For example, the light source can be infrared light for marks using infrared sensitive ink. The marks are recognized in the first visual representation and the positions of the marks are determined. The second visual representation can capture the set of notes and the system can determine the general boundary of each note based on its mark respectively. After the general boundary of a note is determined, the system extracts the content of the note (step 350B). For example, where the visual representation is an image, the system may crop the image according to the determined general boundary of the note. Optionally, the system may enhance the content of the note (step 360B), for example, by changing the contrast, brightness, and/or using other image processing techniques. In some cases, the system may update the note with a status indicating its content extracted.

Figure 3C:
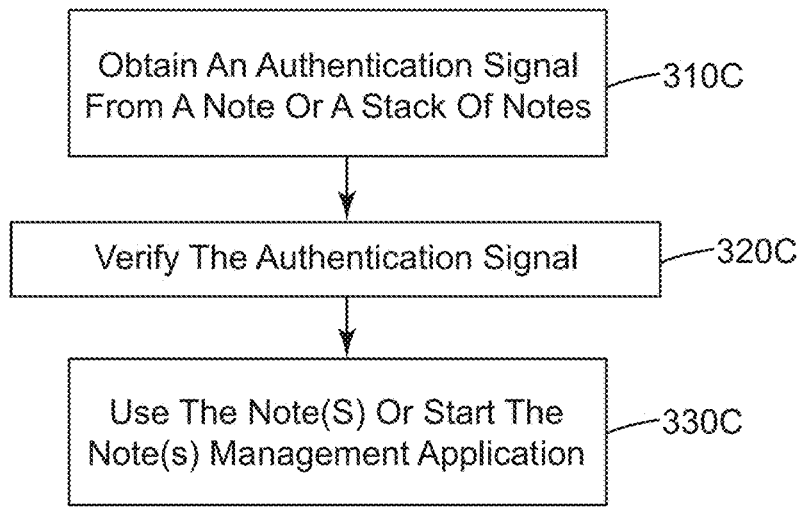
FIG. 3C illustrates a flow diagram of an embodiment of authenticating a note.

FIG. 3C illustrates a flow diagram of an embodiment of authenticating a note. First, obtain an authentication signal from a note or a stack of notes (step 310C). In one embodiment, the authentication information is a visual component (e.g., a hologram) of a mark on a note and the authentication signal can be obtained by extracting the visual component from a visual representation capturing the note. In another embodiment, the authentication information is contained in an electronic component (e.g., a RFID tag) of a mark on a note and the authentication signal can be obtained using a suitable reader (e.g., a RFID reader). Next, the system verifies the authentication signal (step 320C). The system can start the note management application or use the note(s) if the note(s) are authenticated (step 330C).

Figure 4A:
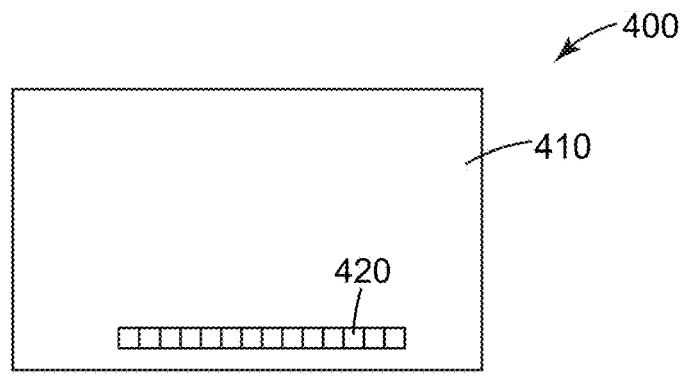
FIGS. 4A-4D illustrate an example of content extraction process of a note with a mark.
Figure 4B:
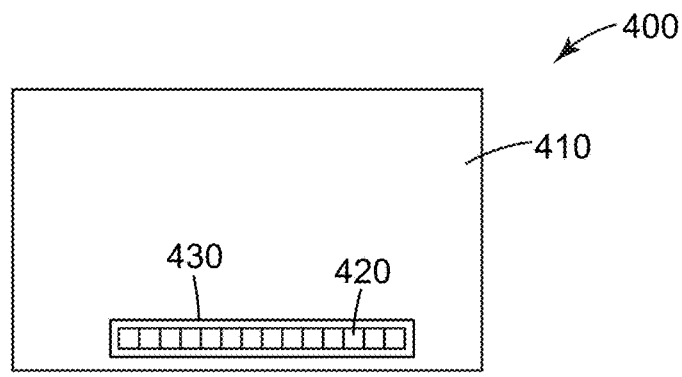
Figure 4C:
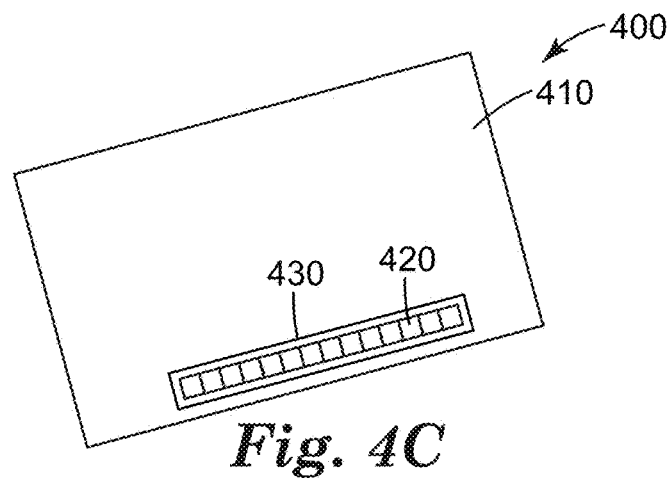
Figure 4D:
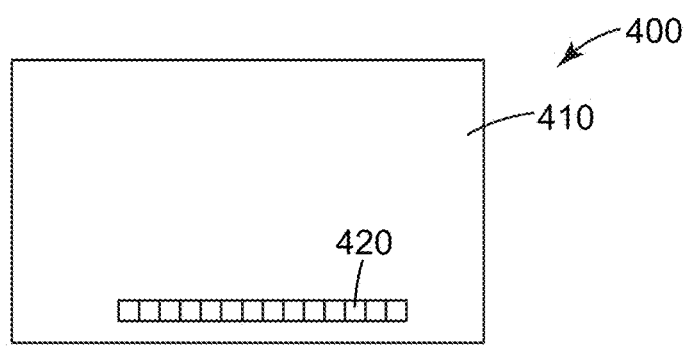

FIGS. 4A-4D illustrate an example of content extraction process of a note with a mark. First, as illustrated in FIG. 4A, a visual representation 400 of a note 410 is captured. The note 410 has a mark 420, which can be a barcode, a color code, a matrix code, a color block, or the like. Next, as illustrated in FIG. 4B, the system determines the general boundary 430 of the mark on the visual representation and recognizes the mark 420. In some cases, the note 410 may be slanted in the visual representation 400, as illustrated in FIG. 4C. In some other cases, the visual representation 400 may be taken with geometric distortion. The system may use the determined general boundary of the mark 420 or a portion of the mark 420 to determine the necessary image transformation and correction to the visual representation 400 to obtain the note content. FIG. 4D illustrates that the system extracts the content of the note 410 after the previous analysis and/or image processing.

Figure 5A:
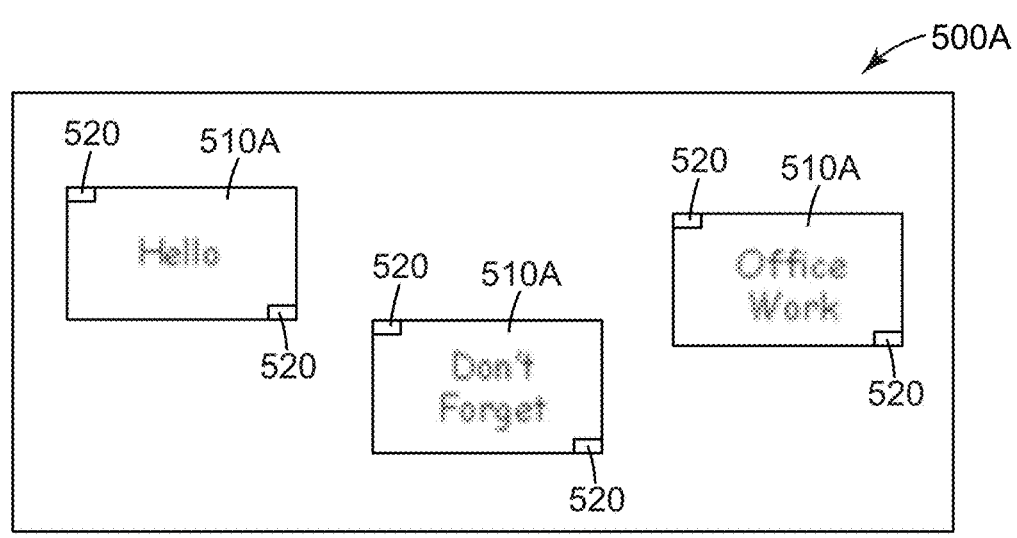
FIGS. 5A-5D illustrate an embodiment of content extraction of a plurality of notes with retroreflective marks.
Figure 5B:
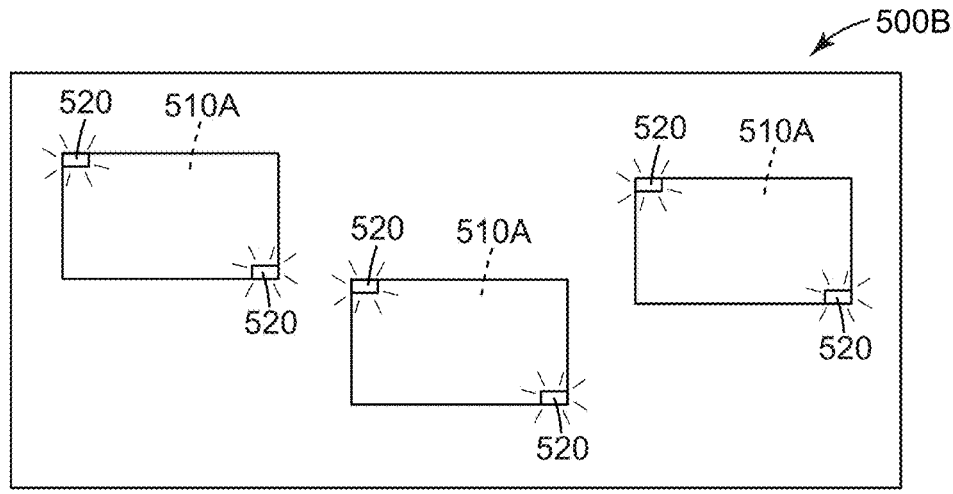
Figure 5C:
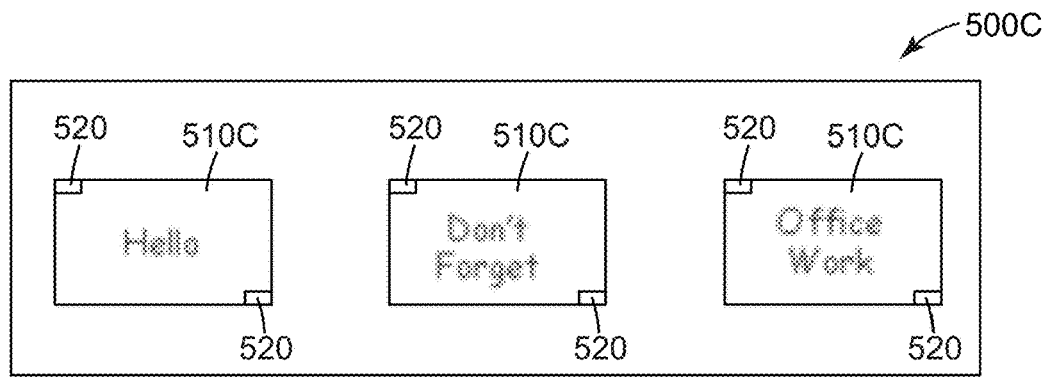
Figure 5D:
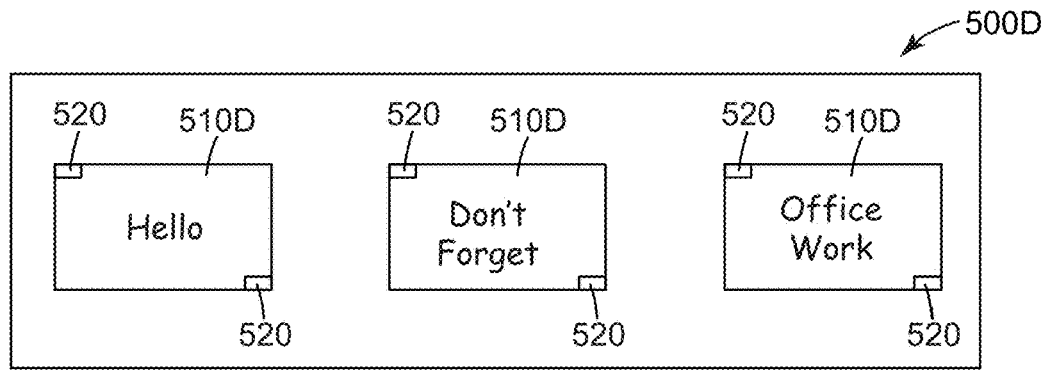

FIGS. 5A-5D illustrate an embodiment of content extraction of a plurality of notes with retroreflective marks. A note recognition/management system receives a visual representation 500A, which captures three notes 510A, and each note 510A has a mark 520 that has two elements—two retroreflective rectangular tags at upper left and lower bottom corners. Because of the optical property of the retroreflective material, the mark 520 is substantially brighter than the rest of the note. FIG. 5B illustrates the marks 520 are much brighter than the notes 510A and the background. In some embodiments, the system may use image processing to transform the visual representation of 500A as illustrated in FIG. 5A to 500B as illustrated in FIG. 5B. In some alternative embodiments, the system may generate another visual representation 500B of the three notes 510A with a different light source, for example, a flash light. The system can easily identify the marks 520 from the visual representation 500B. After the marks 520 are identified, the system can extract the content of the notes 510C, as illustrated in FIG. 5C. In some cases, the system may use image processing technique (e.g., adaptive histogram equalization) to enhance the extracted content 510D, as illustrated in FIG. 5D.

Figure 6:
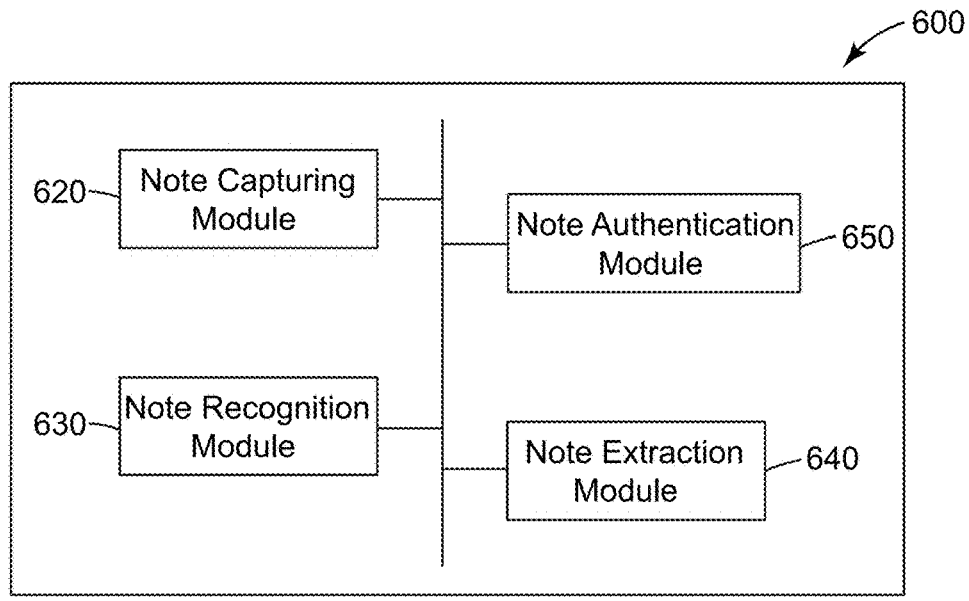
FIG. 6 illustrates a module diagram of an embodiment of a note recognition system.

FIG. 6 illustrates a module diagram of an embodiment of a note recognition system 600. In the embodiment as illustrated, the system 600 includes a note capturing module 620, a note recognition module 630, and a note extraction module 640. Various components of the note recognition system 600 can be implemented by one or more computing devices, including but not limited to, circuits, a computer, a processor, a processing unit, a microprocessor, and/or a tablet computer. In some cases, various components of the note recognition system 600 can be implemented on a shared computing device. Alternatively, a component of the system 600 can be implemented on multiple computing devices. In some implementations, various modules and components of the system 600 can be implemented as software, hardware, firmware, or a combination thereof. In some cases, various components of the note recognition system 600 can be implemented in software or firmware executed by a computing device. Additionally, various components of the system 600 can communicate via or be coupled to via a communication interface, for example, a wired or wireless interface. The note capturing module 620 is configured to capture a visual representation of a plurality of physical notes. In some embodiments, the note capturing module 620 includes an image sensor. The note recognition module 630 is coupled to the note capturing module 620, the note recognition module is configured to receive the captured visual representation and determine a general boundary of one of the plurality of physical notes from the captured visual representation. In some cases, the note recognition module 630 is configured to create a digital note representative of the recognized physical note. The note extraction module 640 is configured to extract content of the one of the plurality of notes from the captured visual representation based on the determined general boundary of the one of the plurality of notes. In some cases, the note extraction module 640 is configured to associate the extracted content with the corresponding digital note.

In some embodiments, the note recognition system 600 includes a note authentication module 650 configured to authenticate the plurality of notes. In some cases, at least some of the plurality of notes have a mark. The mark can be used to facilitate the recognition, extraction and authentication of the note. For example, the note authentication module 650 can obtain an authentication signal from a mark of a note and verify the authentication based on the authentication signal. In some cases, the note authentication module 650 is coupled to the note recognition module 630 and provides the authentication information to the note recognition module 630. In some embodiments, the note recognition module 630 and the note extraction module 640 can perform the steps illustrated in FIG. 3B and in the relevant discussions.

In some embodiments, a note recognition/management system may use multiple recognition algorithms to recognize notes and extract notes' content, such as color recognition, shape recognition, and pattern recognition. For example, the system may use color spaces such as the RGB, HSV, CIELAB, etc. to identify regions of interest corresponding to the notes for color recognition. In some cases, the notes are further distinguished in their shape and due to the presence of unique patterns detected by shape recognition (e.g., Hough transform, shape context, etc.) and pattern recognition algorithms (e.g., Support Vector Machine, cross-correlation, template matching, etc.) respectively. These algorithms help filter out unwanted objects in the visual representation or other sources of notes' content and leave only those regions of interest corresponding to the notes.

In an embodiment, a note may include a mark made using fluorescent materials, such as printable inks or coatable dyes. For example, a fiducial mark such as a logo can be printed in fluorescent ink on the writing surface of a note. An appropriate light source would excite the fluorescent material. For example, a white LED (light emitting diode) of a mobile handheld device may be able to excite the fluorophore using the significant blue wavelength component of the LED output spectrum. In one embodiment, a fluorescent dye can be coated on the writing surface of the notes or included in the materials making the notes. In this embodiment, the fluorescent dye can provide not only verification of a branded product but can also improve the contrast between the written information on the note and the background of the note itself. Such mark can facilitate the recognition and segmentation of notes on a visual representation produced by an image sensor. In the cases of notes made from paper with fluorescent dye, the captured visual representation may have better readability. Depending on the excitation wavelength range and the fluorescing wavelength range for the fluorescent materials, additional optical equipment, such as a filter, may be used together with an image sensor (e.g., a camera) to improve detection.

Figure 7A:
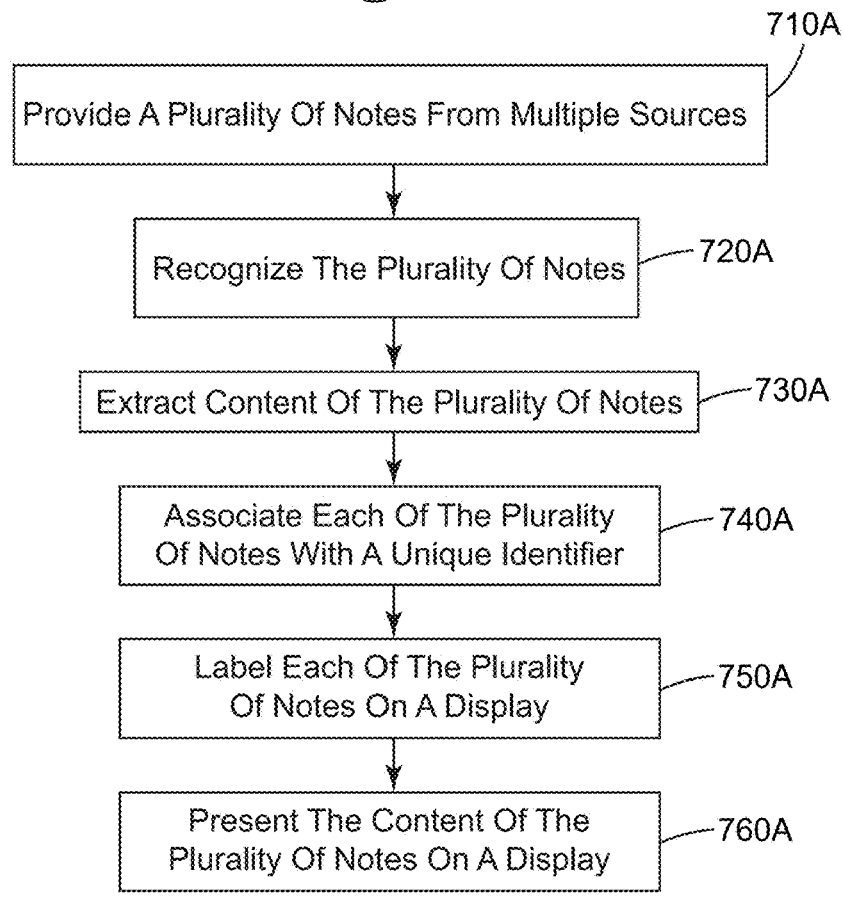
FIG. 7A illustrates a flow diagram of an embodiment of a note management system.

FIG. 7A illustrates a flow diagram of an embodiment of a note management system. First, the system receives a plurality of notes from multiple sources (step 710A). For example, the note management system may receive a set of images of a number of notes from a camera or a smart phone and receive another set of images of a number of notes taken from a remote location. As another example, the note management system may receive a visual representation (e.g., a video) of a number of notes taken by a video recording device and a text stream of notes that is entered via a laptop. In some embodiments, the multiple sources are sources of notes' content taken from different devices, for example, cameras, scanners, computers, etc. Then, the system recognizes one of the plurality of notes (step 720A). In some cases, the system creates digital notes representative of the one of the plurality of physical notes, and the system extracts content of the plurality of notes (step 730A).

In some cases, the system associates the extracted content with the corresponding digital notes representative of physical notes. In some embodiments, some notes include marks (e.g., color block, color code, barcode, etc.) on the note and one source of notes is a visual representation of some of the notes. In some cases, the recognizing step includes recognizing marks on the notes from the visual representation and then determines the general boundaries of the notes based on the recognized marks. In some of these cases, the extracting step includes extracting the content based upon the recognized marks, known shapes of the notes, and known relative positions of the marks on the notes. After the content of the plurality of notes is extracted, in some cases, the system may associate each of the plurality of digital notes with a unique identifier (step 740A). The system may label each of the plurality of digital notes with a category (step 750A). The labeling step is discussed in more details below. Additionally, the system may first authenticate the notes before recognizing the notes. Optionally, the system may present the content of the plurality of notes on a display (step 760A). In some embodiments, the system may present the extracted content of the plurality of notes with an output field indicating the categories of the notes. In some implementations, the system may use the category information of the digital notes in presenting the digital notes (e.g., show the notes in one category in a group).

Figure 7B:
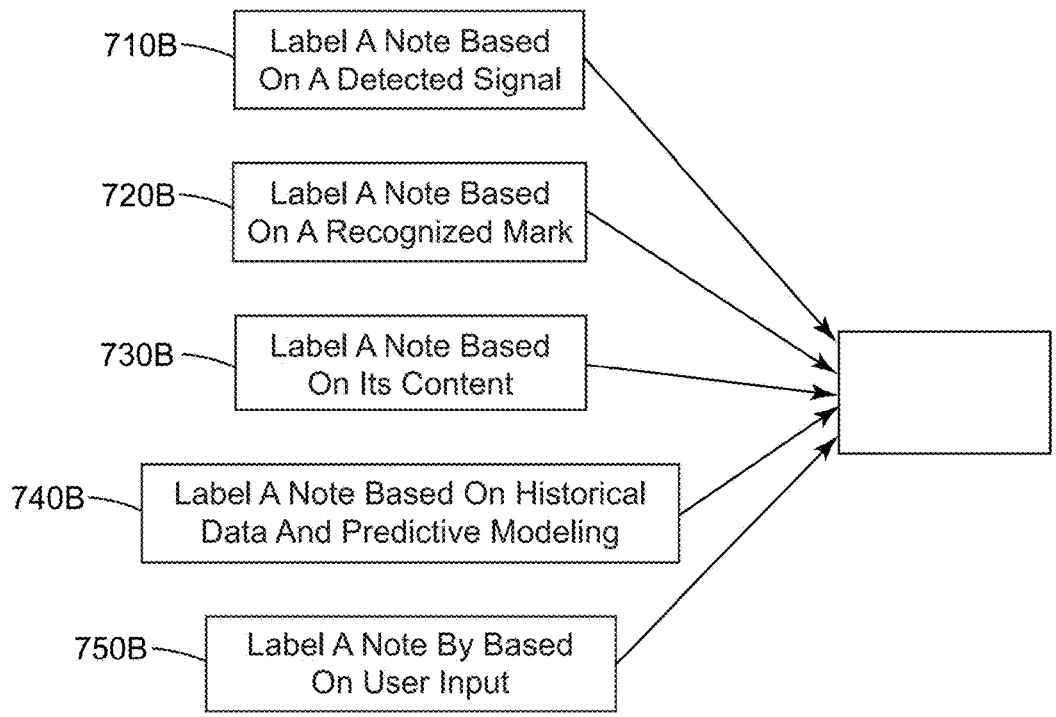
FIG. 7B illustrates examples of how a system may label a note.

FIG. 7B illustrates examples of how a system may label a digital note. In one embodiment, a note management system can label a note based on a detected signal (710B). For example, a note can have a mark including a barcode; the system can read the barcode and label the note based on the barcode. In some cases, the system can label a note based on a recognized mark (720B). For example, the mark can include an icon, logo, or other graphical symbol indicating a particular group. The system may further label a note based on its content (730B). In some cases, the system may label a noted based on historical data and/or predictive modeling (740B). In some other cases, the system may label a note by user input (750B). A note management system can use one or more approaches to label a note. The system may also use other approaches to label a note that are not listed in FIG. 7B, for example, label a note based on the shape of the note. Further, in some cases, a note may be associated with more than one category.

Figure 8:
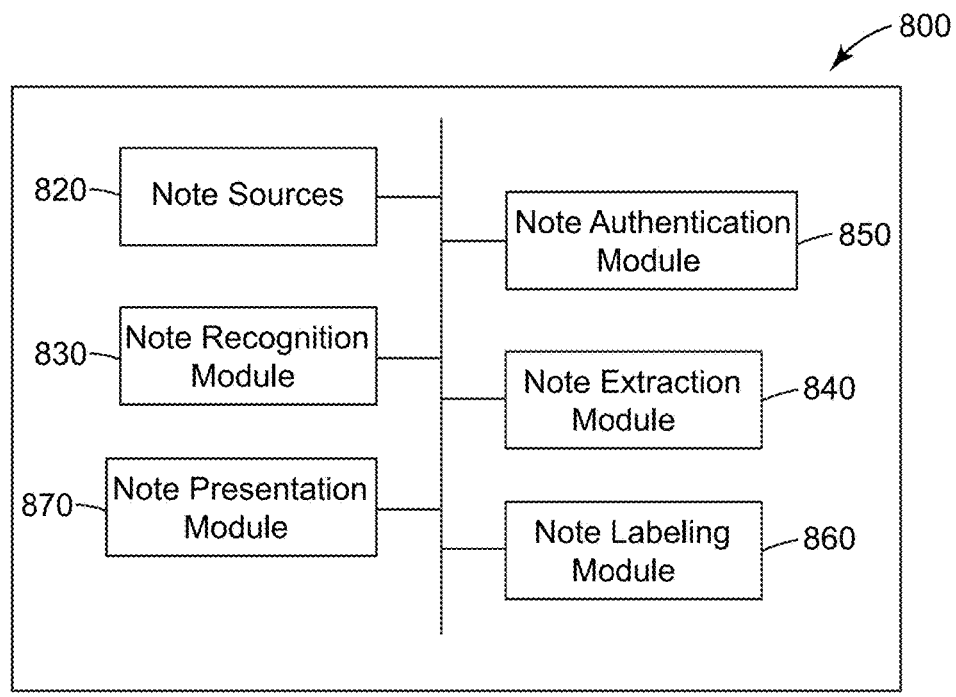
FIG. 8 illustrates a module diagram of an embodiment of a note management system.

FIG. 8 illustrates a module diagram of a note management system 800. In the embodiment as illustrated, the system 800 includes one or more note sources 820, a note recognition module 830, a note extraction module 840, and a note labeling module 860. Various components of the note management system 800 can be implemented by one or more computing devices, including but not limited to, circuits, a computer, a processor, a processing unit, a microprocessor, and/or a tablet computer. In some cases, various components of the note management system 800 can be implemented on a shared computing device. Alternatively, a component of the system 800 can be implemented on multiple computing devices. In some implementations, various modules and components of the system 800 can be implemented as software, hardware, firmware, or a combination thereof. In some cases, various components of the note management system 800 can be implemented in software or firmware executed by a computing device. Additionally, various components of the system 800 can communicate via or be coupled to via a communication interface, for example, a wired or wireless interface. The note source(s) 820 is configured to provide a plurality of notes. In some embodiments, one of the note sources 820 is a visual representation of a scene having one or more physical notes. In some cases, the note sources 820 include a plurality of different sources for providing notes, for example, images, text stream, video stream, or the like. The note recognition module 830 is coupled to the note sources 820, the note recognition module is configured to receive the visual representation, determine a general boundary of a physical note from the visual representation and create a digital note representative of the physical note. The note extraction module 840 is configured to extract content of the one of the plurality of physical notes from the visual representation based on the determined general boundary of the one of the plurality of physical notes and associate the extracted content with the corresponding digital notes. The note labeling module 860 is configured to label the one of the plurality of digital notes with a category.

In some embodiments, the note management system 800 includes a note authentication module 850 which is configured to authenticate the plurality of notes. In some cases, at least some of the plurality of notes have a mark. The mark can be used to facilitate the recognition, extraction and authentication of the note. For example, the note authentication module 850 can obtain an authentication signal from a mark of a note and verify the authentication based on the authentication signal. In some cases, the note authentication module 850 is coupled to the note recognition module 830 and provides the authentication information to the note recognition module 830. In some embodiments, the note recognition module 830 and the note extraction module 840 can perform the steps illustrated in FIG. 3B and in the relevant discussions. In some embodiments, the note labeling module 860 can use one or more labeling approaches illustrated in FIG. 7B and in the relevant discussions. In some cases, a note may be associated with more than one category.

In some embodiments, the note management system 800 may include a note presentation module 870, which is configured to gather content of the plurality of digital notes and present at least part of the plurality of notes according to the category of the notes. For example, the note presentation module 870 can organize the plurality of digital notes into groups that have the same category. As another example, the note presentation module 870 can add connection lines and/or arrows of different groups of digital notes.

Figure 9:
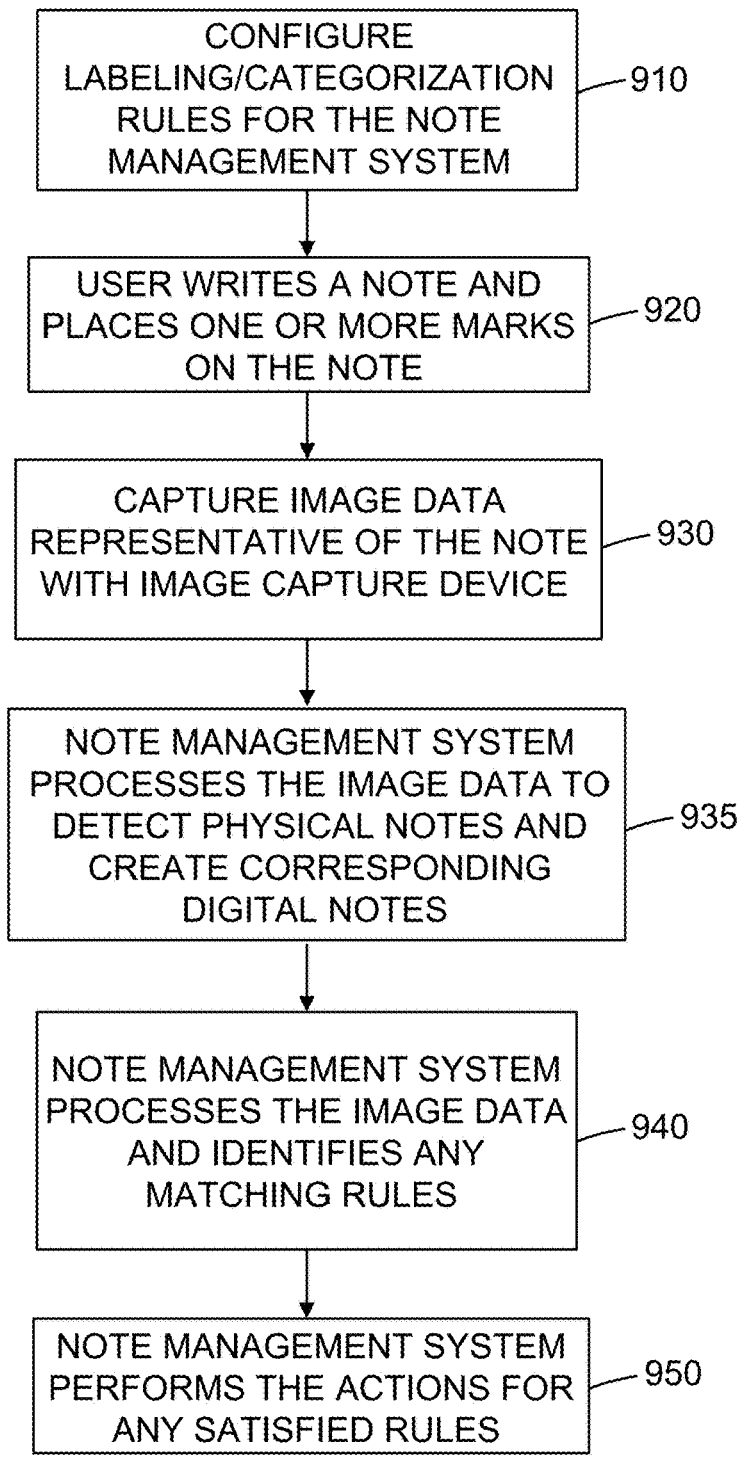
FIG. 9 illustrates a flow diagram of how a user may use an embodiment of a note management system.

FIG. 9 is a flow diagram illustrating example operation of an event control application executing on a note management application executing on mobile device. As explained above, the event control application may execute on mobile device 15 to provide user 26 fine-grain control over actions or events taken by mobile device 15 responsive to detection of one or more physical notes 22 having characteristics that match specified criteria, such as color, shape, size, markers placed thereon and the like. For purposes of example, FIG. 9 is described in reference to note management application 78 and mobile device 15 of FIGS. 1A-1C.

First, note management application 78 is configured, e.g., by a user, to specify rules for taking actions in response to detection of physical notes having certain characteristics (step 910). In some examples, note management application 78 may be installed on mobile device with a set of preconfigured rules that specify actions and criteria of notes, such as markings, for triggering the actions. In other examples, a user may map an action to specific characteristics of marks, such as those discussed in conjunction with FIG. 1D, for the note.

For example, the user may decide that he would like all physical notes detected within the image data having a retroreflective circle to be made into digital notes, given a first label, and grouped in a first group, and all notes written on blue paper to be made into digital notes, given a second label, and grouped in a second group. As another example, the user may specify that certain physical notes 22 having characteristics or markings are to trigger corresponding creation, update or completion of calendar entries. In some examples, note management application 78 may output user interface 98 to include input mechanisms by which the user is able to specify rules having actions, such as a note grouping action or an action related to another application executing on the mobile device, such as a calendaring action related to a calendar application, and define criteria for triggering the actions. During this configuration process, user interface 98 may prompt the user to capture image data representative of an example note for triggering an action and process the image data to extract characteristics, such as color or content. User interface 98 may then present the determined criteria to the user to aid in defining corresponding rules for the example note.

In operation, the user writes or otherwise creates one or more physical notes and may place one or more markers on the note (unless the note itself contains certain characteristics the user wants to trigger actions, e.g., blue paper) (step 920). The user then uses an image capture device to capture image data representative of the note (step 930). For example, the user may interact with mobile device 15 to capture, by a sensor of the mobile device such as a camera, image data containing a visual representation of a plurality of physical notes, each of the physical notes comprising separate physical objects.

With the image data representative of the note, the note management application processes the image data to detect the different physical notes represented within the image, detects the aspects of the notes and/or marker(s) and recognizes the text on the note (step 935). That is, note management application 78 may process the image data with a processor of mobile device 15 to determine respective boundaries within the image data for each of the plurality of physical notes and to determine, based on the boundaries, one or more characteristics for each of the physical notes. In addition, note management application 78 may create, with the processor, a respective digital note representative of each of the plurality of physical notes. During this process, note management application 78 may update database 94 to insert a record to represent the digital note, and may store within the database information (e.g., content) extracted from the input image within boundaries determined for the physical note as detected by note identification module 86.

Further, based on the characteristics of the note, such as the marker(s), the text of the note and/or the color(s) of the note, note management application 78 applies rules 101 and determines whether the characteristics of any of the physical notes satisfy the criteria for one or more of the rules. That is, note management application 78 applies rules 101 to the newly created digital notes to identify which of the rules specify criteria satisfied by one or more of the respective characteristics of the physical notes corresponding to the digital notes (step 940).

If any rules are satisfied, the note management system performs the actions specified by the rules to each of the digital notes for which the characteristics of the corresponding one of the physical notes satisfies the criteria specified by the rule (step 950). That is, for each of the identified rules, note management application 78 performs the actions specified by the respective rule to each of the digital notes for which the characteristics of the corresponding one of the physical notes satisfies the criteria specified by the rule. Using the examples given above, if the user has attached a retroreflective, circular sticker to the note, the note management system will create a digital note of the user's physical note, label the digital note with the first label, and group the digital note in the first group. If the user has written the note on blue paper, the note management system will create a digital note of the user's physical note, label the digital note with the second label, and group the digital note in the second group.

In some embodiments, the user can configure the note management system with rules having actions that can label/categorize the notes in more than one way or location. For example, this will occur if, using the same example given above, the user writes a note on blue paper and attaches a retroreflective, circular sticker to the note. In this situation, the note management program will determine that multiple rules are satisfied and will create a digital note of the user's physical note, label the digital note with both the first and second labels, and group the digital note in both the first and second groups.

Figure 10:
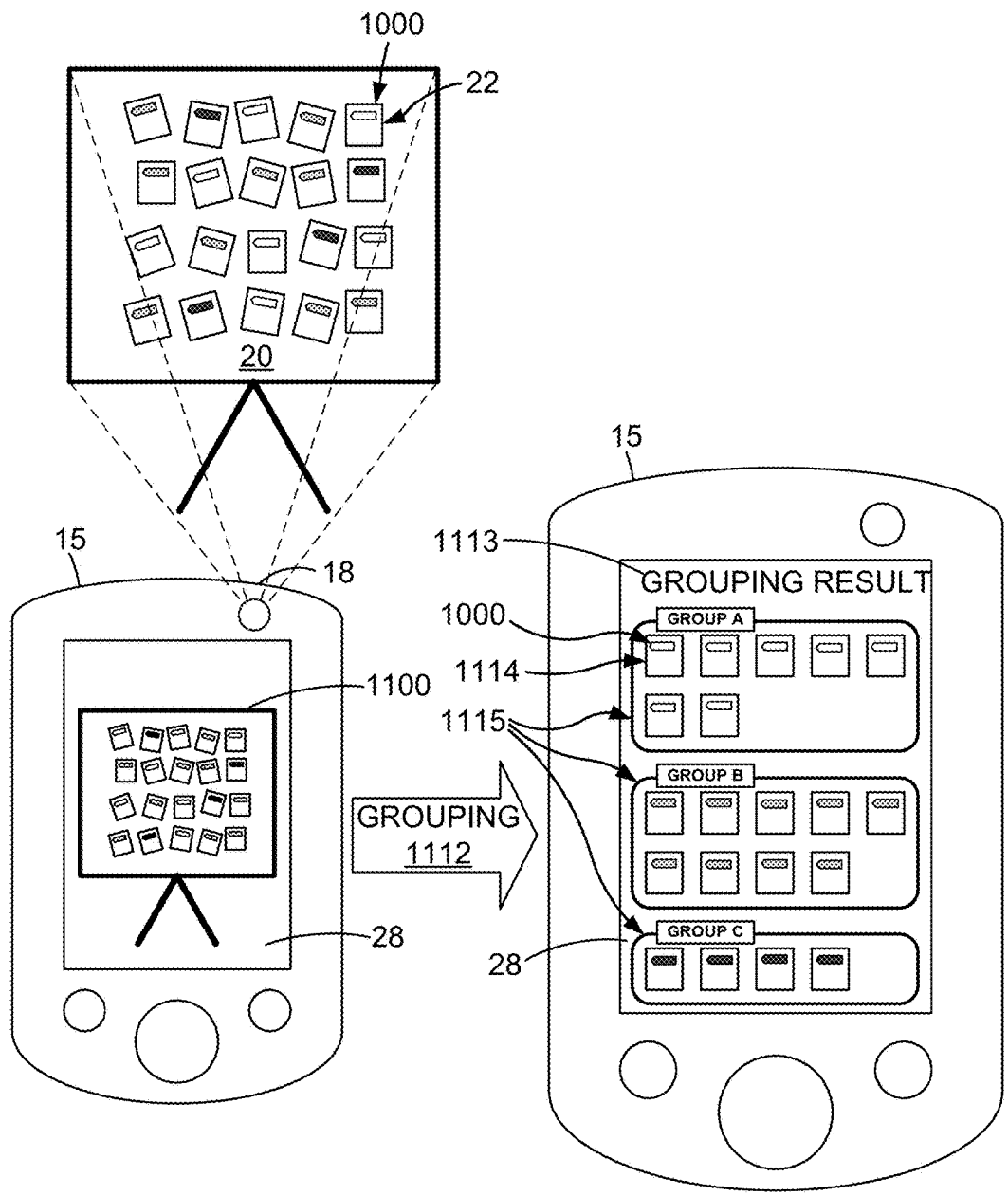
FIG. 10 is a representation illustrating one example of a note management application executing on a mobile device and processing image data of a plurality of physical notes to label and categorize the plurality of corresponding digital notes.

FIG. 10 illustrates one example of the note management application 78 creating a plurality of digital notes corresponding to physical notes captured in an environment and applying rules to trigger actions, such as labeling and categorization of each of the plurality of digital notes based on characteristics detected from the respective physical note. In the example of FIG. 10, workspace 20 contains notes 22, each with a mark 1000 attached to it. Each mark 1000 has the same shape but is one of three different colors: white, light gray, and dark gray. A user captures an image of workspace 20, including notes 22 with marks 1000, by using image capture device 18 on mobile device 15. In FIG. 10, presentation device 28 of mobile device 15 shows the image 1100 of workspace 20 after the user has captured image 1100 or is in the process of capturing image 1100. Using image 1100, an embodiment of a note management system then extracts the content from notes 22, creates one or more digital notes 1114 representative of notes 22, and applies grouping rule(s) 1112 to label and categorize digital notes 1114, thereby creating grouping result 1113. In the example of FIG. 10, the note management system applies grouping rule(s) 1112 to group digital notes 1114 into one of three groups 1115 based on the color of mark 1000 originally attached to each physical note 22. The embodiment groups digital notes 1114 with a white mark into Group A, a light gray mark into Group B, and a dark gray mark into Group C. Finally, the grouping result 1113 is displayed to the user on presentation device 28 of mobile device 15.

Figure 11:
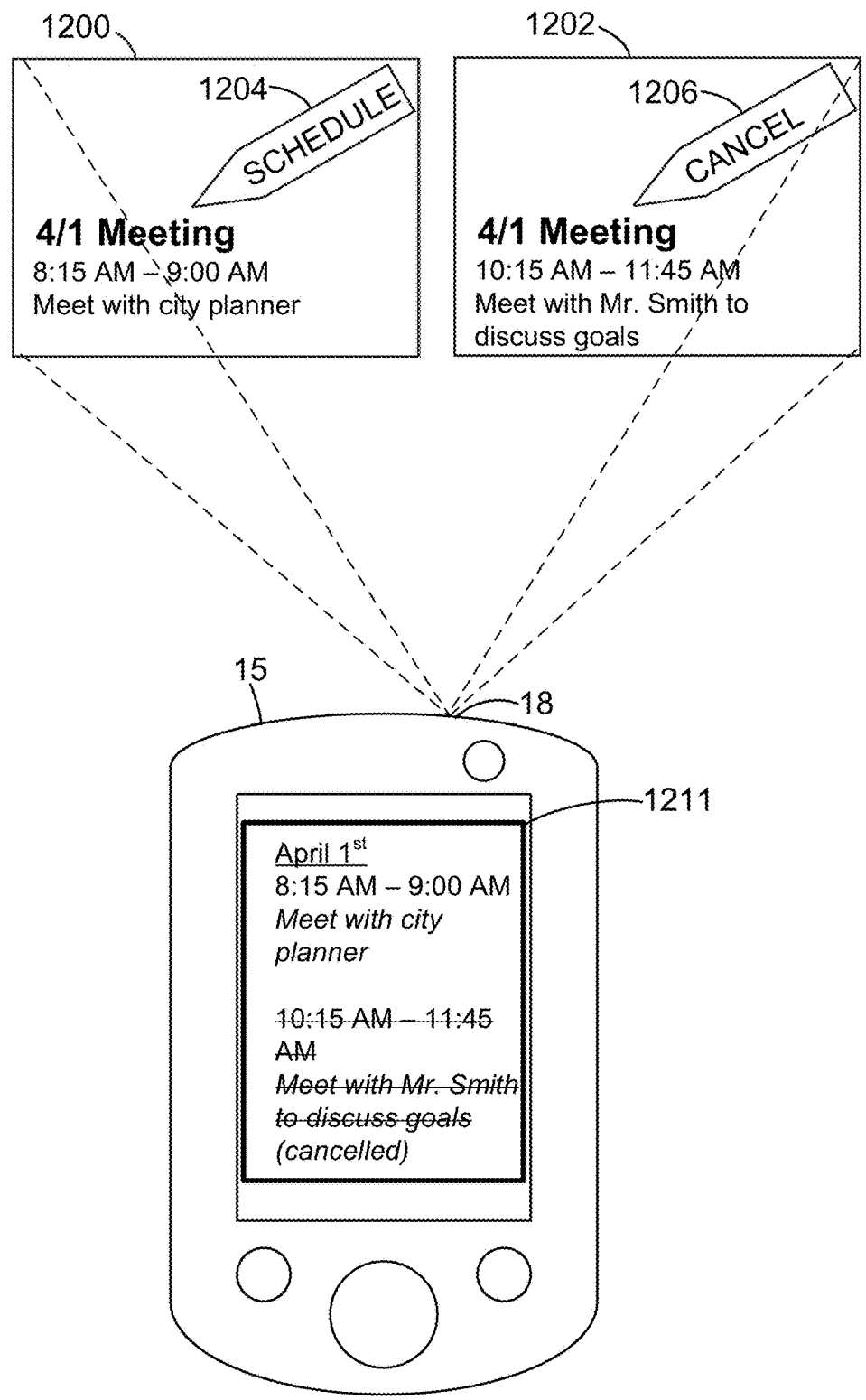
FIG. 11 illustrates another example in which a note management application processes image data to automatically invoke calendaring actions on a mobile device.

FIG. 11 illustrates another example in which note management application 78 processes image data to create a plurality of digital notes corresponding to physical notes 1200, 1202. In this example, when processing the image data and creating the respective digital notes, note management application 78 applies rules that trigger actions causing the note management application to invoke a calendaring application 1211 executing on mobile device 15. For example, responsive to processing the image data so as to identify physical note 1200 and identify marker 1204 (in this example, a physical note marked "SCHEDULE"), note management application 78 creates corresponding digital notes containing content extracted from the respective physical note. In addition, note management application 78 may invoke calendaring application 1211, e.g., by way of an API, to create an entry for a meeting event on April 1$^{st}$ from 8:15 AM-9:00 AM based on the content parsed from the physical note 1200. In addition, note management application 78 may invoke the calendaring application to designate as cancelled a meeting on April 1$^{st}$ from 10:15 AM-12:00 AM in response to processing image data so as to identify physical note 1202 having marker 1206 (in this example, a physical note marked "CANCEL").

In this way, note management application 78 executing on mobile device 15 may process image data containing a visual representation of a plurality of physical notes that, in turn, trigger the note management application to communicate with a second software application executing on the mobile device, e.g., by way of an API of the second application, so as to instruct the second software application to perform one or more the actions. In the example of FIG. 11, the second software application comprises calendar application 1211 executing on mobile device 15 and, for each of the physical notes having characteristics that satisfies at least one of the rules, note management application 78 directs the calendar application to perform a scheduling operation with respect to a calendar entry, such as scheduling, modifying, or canceling a calendar event.

Figure 12:
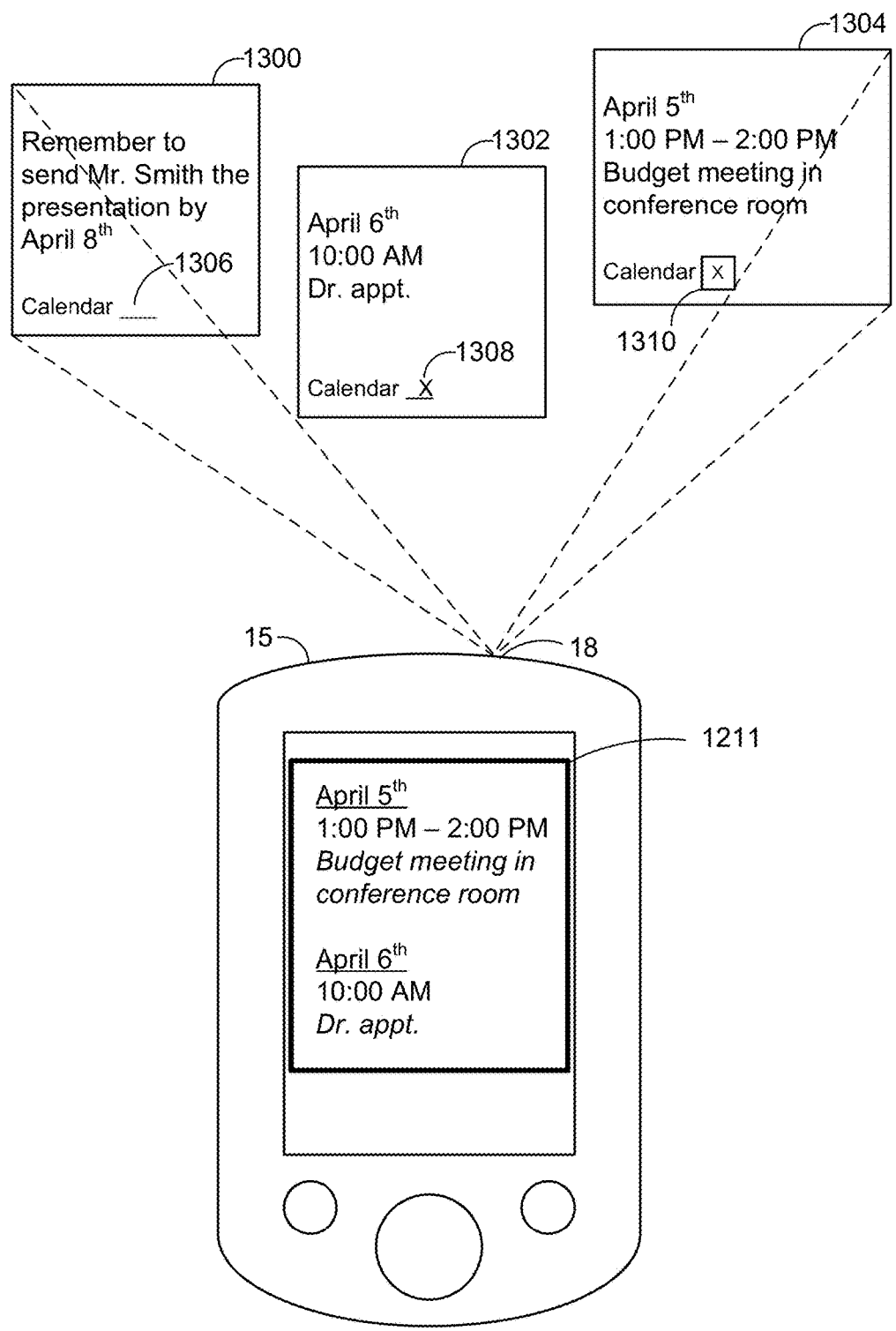
FIG. 12 illustrates another example in which a note management application processes image data to determine whether to automatically invoke calendaring actions on a mobile device.

FIG. 12 illustrates another example in which note management application 78 processes image data to create a plurality of digital notes corresponding to physical notes 1300, 1302, 1304. In this example, when processing the image data and creating the respective digital notes, note management application 78 applies rules that determine whether or not to trigger actions causing the note management application to invoke the calendaring application 1211 executing on mobile device 15. For example, notes 1300 and 1302 contain markers 1306 and 1308, respectively, of a pre-printed line next to a designation of "Calendar." The pre-printed line has been "checked" in marker 1308, which designates that note 1302 is a calendar entry, while the pre-printed line remains blank in marker 1306, which designates that note 1300 is not to be processed as a calendar entry. Responsive to processing the image data so as to identify physical notes 1300 and 1302 and their respective markers 1306 (blank pre-printed line) and 1308 (checked pre-printed line), note management application 78 creates corresponding digital notes containing content extracted from the respective physical note. In this example, note management application 78 also determines that note 1300 does not triggers creation of a calendar entry because marker 1306 is un-checked, while note 1302 triggers creation of a calendar entry because marker 1308 is checked. In response to making this determination, note management application 78 may invoke calendaring application 1211, e.g., by way of an API, to create an entry for an appointment on April 6$^{th}$ based on the content parsed from the physical note 1302. However, note management application 78 does not invoke calendaring application 1211 to create an entry corresponding to note 1300 because it has determined that note 1300 is not a calendar entry based on marker 1306.

As another example, note 1304 contains marker 1310 of a pre-printed box next to a designation of "Calendar." The pre-printed box has been checked in marker 1310, which designates that note 1304 is a calendar entry. Alternatively, if the pre-printed box had not been checked in marker 1310 and instead had been kept blank, it would designate that note 1304 is not a calendar entry. In processing the image data, note management system identifies note 1304 with marker 1310 in addition to identifying note 1300 with marker 1306 and note 1302 with marker 1308. Responsive to identifying note 1304 with marker 1310, note management application 78 creates a digital note containing content extracted from note 1304, in the same way it creates digital notes containing content extracted from notes 1300 and 1302, respectively. Note management application 78 may also determine that, as the pre-printed box has been checked in marker 1310, note 1304 is a calendar entry. In response to this determination, note management application may invoke calendaring application 1211, e.g., by way of an API, to create an entry for a meeting on April 5$^{th}$ based on the content parsed from the physical note 1302. Alternatively, if the pre-printed box in marker 1310 had not been checked, note management application 78 would determine that note 1304 is not a calendar entry and would not invoke calendaring application 1211, accordingly.

Markers 1306, 1308, and 1310 are just some examples of pre-printed markers that, by a user checking or marking the pre-printed marker, designate the note associated with the marker as a calendar event. Other examples of such pre-printed markers are contemplated, such as a pre-printed circle that is checked or filled in to designate that its associated note is a calendar entry.

In this way, note management application 78 executing on mobile device 15 may process image data containing a visual representation of a plurality of physical notes that, in turn, trigger the note management application to selectively communicate with a second software application executing on the mobile device, e.g., by way of an API of the second application, so as to selectively instruct the second software application to perform one or more actions. In the example of FIG. 11, the second software application comprises calendar application 1211 executing on mobile device 15 and, for each of the physical notes having characteristics that satisfies at least one of the rules, note management application 78 directs the calendar application to perform a scheduling operation with respect to a calendar entry, such as scheduling, modifying, or canceling a calendar event.

In some examples, actions, such as creating a calendar entry, may alternatively or additionally be triggered in note management application 78 in response to note management application 78 detecting a presence of markers different from pre-printed markers 1306, 1308, and 1310 of FIG. 12. As examples, one or more actions may be triggered in note management application 78 by note characteristics such as the color of the note, the shape of the note, a type of the note, a bar code or a Quick Response (QR) code printed on or adhered to the note, a color code printed on or adhered to the note, the shade of the note or shading added to the note, one or more folded corners on the note, and/or a type or characteristic of writing tool used to write on or mark the note. Types of notes may include, for example, standard Post-It® notes, Post-It® Big Pad notes, easel pad notes, flags, notes associated with a calendar, notes associated with a white board, or posters. For example, an action may be triggered if note management application 78 determines that text written on the note has been written in a certain color ink or highlighted with a certain color of highlighter ink. As another example, a first action may be triggered if note management application 78 determines that one corner of the note is folded, and a second action may be triggered if note management application 78 determines that two corners of the note are folded. As described above, note management application 78 may be configured, e.g., by user input 26, to specify rules 101 that trigger actions in response to detection of physical notes having certain characteristics. Moreover, in some examples, actions may be triggered in note management application 78 by pre-printed markers different from those discussed with respect to FIG. 12. For example, a note may contain a pre-printed marker with a circle next to each of the following designations: "Calendar entry," "Email," and "To do." If note management application 78 determines that the circle next to the "Calendar entry" designation on the note has been checked or filled in, note management application 78 will create a calendar entry from content extracted from the note. However, if note management application 78 determines that the circle next to the "Email" designation on the note has been checked or filled in, it will create an email based on the content extracted from the note. Similarly, if note management application 78 determines that the circle next to the "To do" designation has been checked or filled it, it will create a "to do" entry based on the content it extracts from the note.

In addition, a number of different types of actions may automatically be triggered by note characteristics, e.g., in accordance with rules 101. As examples, note management application 78 may be configured to, in response to detecting one or more markers or other characteristics of one or more physical notes, create and/or send a calendar invitation; create one or more groups of digital notes associated with the one or more physical notes; sort one or more digital notes into groups; add an entry to a "to do" list; add a note to and/or reorder the "Favorites" list on mobile device 15; create an email; create a text message; create and/or modify a visual organization board (e.g., a Kanban board); auto export content (e.g., as a PDF file or PPT file); create a link to a social medial website; and/or post content to a social media website.

As one example, in response to determining each note in a set of physical notes to be either square-shaped or rectangular-shaped, note management application 78 may create groups of digital notes. In this example, note management application 78 may create a group title from the content parsed from each rectangular-shaped note and, after creating a digital note corresponding to each square-shaped physical note, sort each digital note into a group based on its corresponding physical note's spatial relationship to the rectangular-shaped physical notes. As another example, after receiving an input image of a physical note marked with an indication of a "to do" task (e.g., a physical note with a "To do" designation checked or filled in), note management application 78 may, in response to determining that the physical note is marked with the indication of the "to do" task, sort a digital note corresponding to the physical note into a group titled "Reminders." The note management application 78 may perform these and other described actions in accordance with respective rules 101 that specify criteria of characteristics of physical notes.

As another example, after receiving an input image with blue physical notes and a purple physical note, note management application 78 may create a list from content parsed from blue physical notes. Then, in response to recognizing that "PPT" in written on the purple physical note, note management application 78 may auto export the list as a Powerpoint (PPT) file.

As a further example, a physical note may have an indication of a task, as well as a corresponding indication of a start date and a due date for the task. In some examples, in response to receiving an input image of the physical note, note management application 78 may invoke a calendar application to automatically update a calendar to add one or more calendar entries that indicate the task and the start date and/or due date to the calendar. In some examples, in response to receiving an input image of the physical note, note management application 78 may automatically update a "to do" list of an application to add an entry to the "to do" list that specifies the task, start date, the due date. In some examples, a physical note may have an indication of a task, an indication of a due date, and an indication of a length of time in which to complete the task. In response to receiving an input image of the physical note, note management application 78 may automatically calculate a start date/time when the task needs to be started for completion by the due date, and automatically update the calendar and/or "to do" list to add the start date/time and due date for the task.

Figure 13:
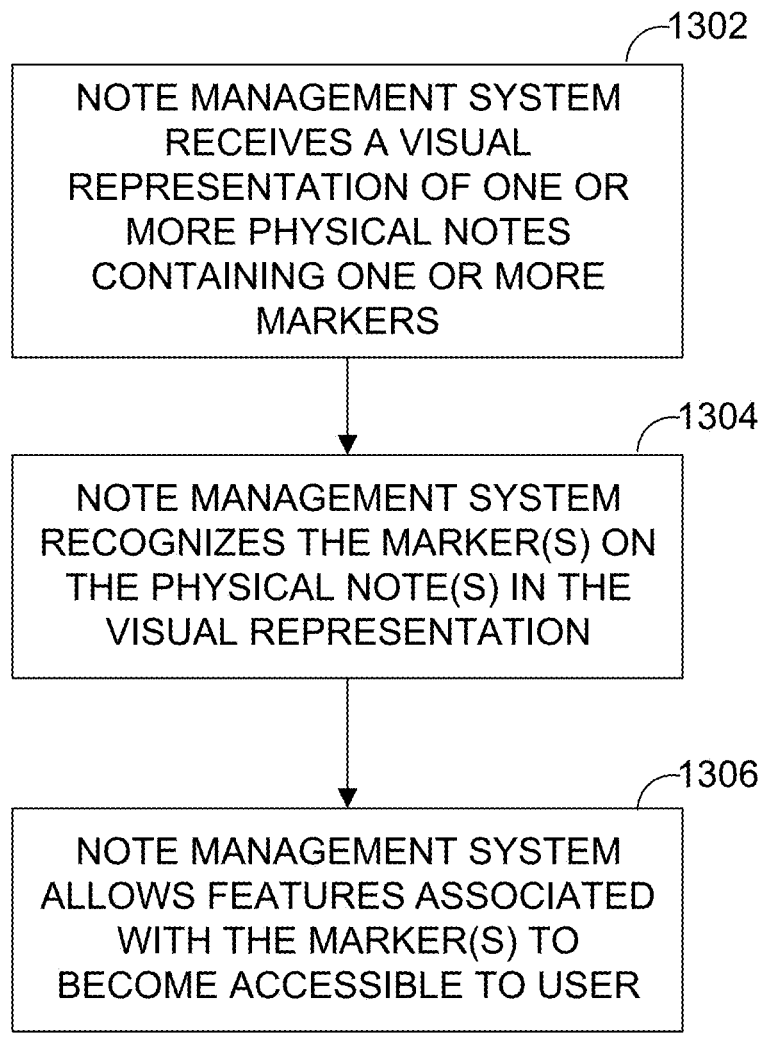
FIG. 13 is a flow diagram illustrating another example operation of a note management system.

FIG. 13 is a flow diagram illustrating another example operation of a note management system. Note management application 78 receives an image of a visual representation of one or more physical notes, where the physical notes have one or more markers or other characteristics (step 1302). Examples of markers are discussed above and may include, for instance, the color of a note, the shape of a note, the type of a note, or other note characteristics. Note management application 78 recognizes the one or more markers on the one or more notes (step 1304). The notes may have recognizable content thereon, e.g., markings added by a user in writing on the physical note. Note management application 78 can apply one or more rules to determine whether one or more actions should be applied based on the recognized markers. In response to recognizing certain markers in the one or more markers, note management application 78 may, in the example of FIG. 12, "unlock" or allow features associated with those certain markers to be accessible to a user (step 1306).

For instance, a user may take a picture of a scene containing an easel pad note and input that picture to a note management system. In response to determining that the input picture contains an easel pad note, the system may allow the user access to easel pad note-specific features in note management application 78 that were previously inaccessible to the user. As another example, a user may write down onto a note an event the user wants added to his or her calendar. The user may input an image of a scene with the event note to the note management system, and in response to detecting the event note, the system may allow features associated with calendar actions, that were previously hidden, to become accessible to the user in note management application 78. In this manner, note management application 78 can take an action of allowing access to one or more applications, application features, or other device features of mobile device 15 in response to detecting a marker or other characteristic of a physical note identified in image data of a visual representation of a scene.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. A method comprising:
    capturing, by a sensor of a mobile device, image data containing a visual representation of a plurality of physical notes, each of the physical notes comprising separate physical objects;
    processing the image data with a processor of the mobile device to determine respective boundaries within the image data for each of the plurality of physical notes and to determine, based on the boundaries, one or more characteristics for each of the physical notes;
    creating, with the processor, a respective digital note representative of each of the plurality of physical notes;
    applying, with the processor, a set of rules to identify which of the rules specify criteria satisfied by one or more of the respective characteristics of the physical notes; and for each of the identified rules, performing, with the processor, in response to determining that at least one of the plurality of physical notes is marked with an indication of a task and a due date, one or more actions including, for at least one of the identified rules, invoking a calendar application executing on the mobile device to add a calendar entry that indicates the task and the due date.

2. The method of claim 1,
    wherein the rules are applied by a first software application executing on the mobile device, and
    wherein performing one or more actions comprises invoking, with the first software application, a second software application executing on the mobile device and instructing the second software application to perform the action, and wherein the second software application is the calendar application.

3. The method of claim 2, wherein invoking the second software application comprises for each of the physical notes having a task and a due date, performing a scheduling operation with respect to the calendar entry.

4. The method of claim 3, wherein performing the scheduling operation comprises one of scheduling, modifying, or canceling a calendar event.

5. The method of claim 1,
    wherein processing the image data comprises extracting, from the image data and based on the boundaries, respective content for each of the physical notes, and
    wherein performing one or more actions comprises, for the at least one physical note having the indication of the task and the due date:
    determining that the at least one physical note includes a marker indicating that the at least one physical note is to be processed as a calendar entry; and
    associating the content extracted from the at least one physical note with the calendar entry.

6. The method of claim 1, wherein performing one or more actions comprises labeling each of the digital notes with one or more categories based on the characteristics of the corresponding one of the physical notes.

7. The method of claim 1, wherein performing one or more actions comprises in response to determining that a physical note is marked with an indication of a task, assigning to a "Reminders" group a respective digital note corresponding to the physical note.

8. The method of claim 1, wherein performing one or more actions comprises in response to determining that a physical note is marked with an indication of a task and a due date, automatically adding a task entry to a "to do" list that indicates the task and the due date.

9. The method of claim 1,
    wherein processing the image data comprises extracting, from the image data and based on the boundaries, respective content for each of the physical notes, and
    wherein performing one or more actions includes associating the respective content for each of the physical notes with the corresponding digital note.

10. The method of claim 1, further comprising:
    receiving, with the processor, input defining a rule that specifies criteria and a resultant action, wherein the criteria specifies one or more characteristics of a note; and
    generating a rule in accordance with the specified criteria and the resultant action.

11. The method of claim 10,
wherein receiving input comprises receiving, with the processor, image data containing a representation or an example physical note, and
wherein generating a rule comprises processing the example physical note to determine characteristics of the example physical note and selecting, based on input from a user, one or more of the characteristics as criteria for the rule.

12. The method of claim 1, wherein performing one or more actions comprises unlocking one or more features of one or more applications executing on the mobile device.

13. A mobile device comprising:
a sensor to produce image data containing a visual representation of a plurality of physical notes, each of the physical notes comprising separate physical objects:
a processor; and
at least one module executable by the processor to:
process the image data to determine respective boundaries within the image data for each of the plurality of physical notes and to determine, based on the boundaries, one or more characteristics for each of the physical notes;
create a respective digital note representative of each of the plurality of physical notes;
apply a set of rules to identify any of the rules that specify criteria satisfied by one or more of the respective characteristics of the physical notes; and
for each of the identified rules, perform, in response to determining that at least one of the physical notes is marked with an indication of a task and a due date, one or more actions including, for at least one of the identified rules, invoking a calendar application executing on the mobile device to add a calendar entry that indicates the task and the due date.

14. The mobile device of claim 13,
wherein the module comprises a note management software application, and wherein the note management software application performs the one or more actions by instructing the calendar application to perform the one or more actions.

15. The mobile device of claim 14,
wherein, for each of the physical notes having characteristics that satisfies the rule, the note management software application performs a scheduling operation with respect to the calendar entry.

16. The mobile device of claim 13, wherein, responsive to each of the physical notes, the calendar application schedules, modifies or cancels a calendar event.

17. The mobile device of claim 13, wherein the at least one module is further executable by the processor to:
extract, from the image data and based on the boundaries, respective content for each of the physical notes,
determine, based on content extracted from the at least one physical note having the indication of the task and the due date, that the at least one physical note includes a marker indicating that the at least one physical note is to be processed as a calendar entry; and
associate the content extracted from the at least one physical note with the calendar entry.

18. The mobile device of claim 13, further comprising:
a database having a plurality of records storing data indicative of the plurality of digital notes,
wherein the module configures the processor to create, for each of the physical notes, the respective digital note within the database, and
wherein the processor applies the rules to label each of the digital notes with one or more categories based on the characteristics of the corresponding one of the physical notes.

19. The mobile device of claim 13, wherein the module, in response to determining that a physical note is marked with an indication of a task, assigns to a "Reminders" group a respective digital note corresponding to the physical note.

20. The mobile device of claim 13, wherein the module, in response to determining that a physical note is marked with an indication of a task and a due date, automatically adds database to associate the respective content for each of the physical notes with the corresponding digital note.

21. The mobile device of claim 13, wherein the module extracts, from the image data and based on the boundaries, respective content for each of the physical notes and updates the records within a database to associate the respective content for each of the physical notes with the corresponding digital note.

22. The mobile device of claim 13, wherein the module configures the processor to:
receive input defining a rule that specifies criteria and a resultant action, wherein the criteria specifies one or more characteristics of a note; and
generate a rule in accordance with the specified criteria and the resultant action.

23. The mobile device of claim 22, wherein the module configures the processor to:
receive image data containing a representation of an example physical note, and process the example physical note to determine characteristics of the example physical note and select, based on input from a user, one or more of the characteristics as criteria for the rule.

24. The mobile device of claim 13, wherein the module performs one or more actions by unlocking one or more features of one or more applications executing on the mobile device.

25. A non-transitory computer-readable storage device comprising instructions that cause a programmable processor to:
capture, by a sensor of a mobile device, image data containing a visual representation of a plurality of physical notes, each of the physical notes comprising separate physical objects;
process the image data with a processor of the mobile device to determine respective boundaries within the image data for each of the plurality of physical notes and to determine, based on the boundaries, one or more characteristics for each of the physical notes;
create, with the processor, a respective digital note representative of each of the physical notes;
apply, with the processor, a set of rules to identify which of the rules specify criteria satisfied by one or more of the respective characteristics of the physical notes; and
for each of the identified rules, perform, in response to determining that a physical note is marked with an indication of a task and a due date, one or more actions including, for at least one of the identified rules, invoking a calendar application executing on the mobile device to add a calendar entry that indicates the task and the due date.

* * * * *

UNITED STATES PATENT AND TRADEMARK OFFICE
CERTIFICATE OF CORRECTION

PATENT NO. : 10,127,196 B2
APPLICATION NO. : 14/600707
DATED : November 13, 2018
INVENTOR(S) : Richard Moore et al.

Page 1 of 1

It is certified that error appears in the above-identified patent and that said Letters Patent is hereby corrected as shown below:

In the Claims

<u>Column 23</u>
Line 3, in Claim 11, delete "or" and insert -- of --, therefor.
Line 16, in Claim 13, delete "objects:" and insert -- objects; --, therefor.
Line 53, in Claim 17, delete "notes," and insert -- notes; --, therefor.

Signed and Sealed this
Seventh Day of May, 2019

Andrei Iancu
*Director of the United States Patent and Trademark Office*